Nov. 13, 1928.

G. J. HUNTLEY 1,691,718

FILLING AND CROWNING MACHINE

Filed Dec. 29, 1921

Inventor
George J. Huntley
by
Mann & Co.
Attorneys

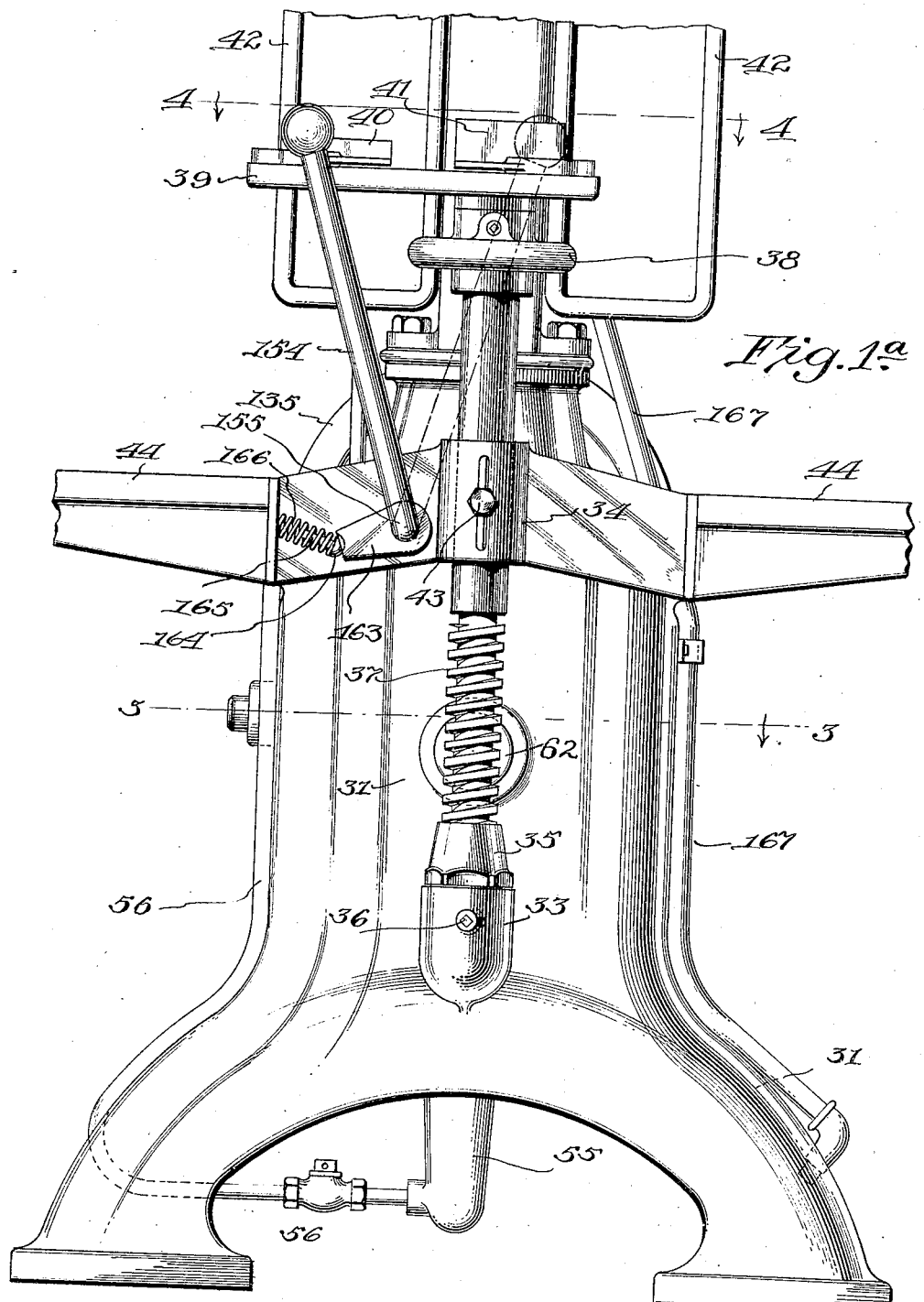
Fig.1ª

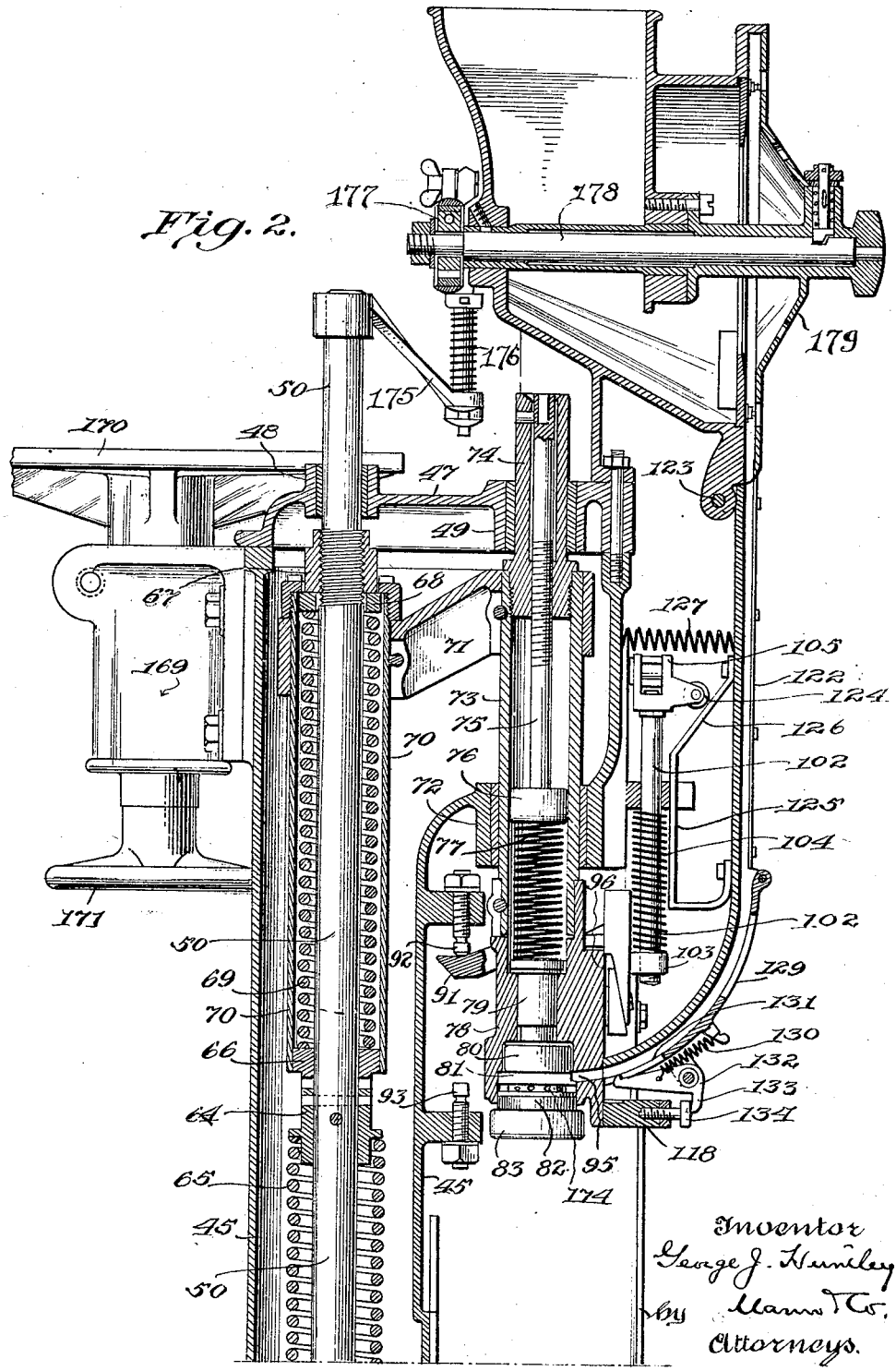

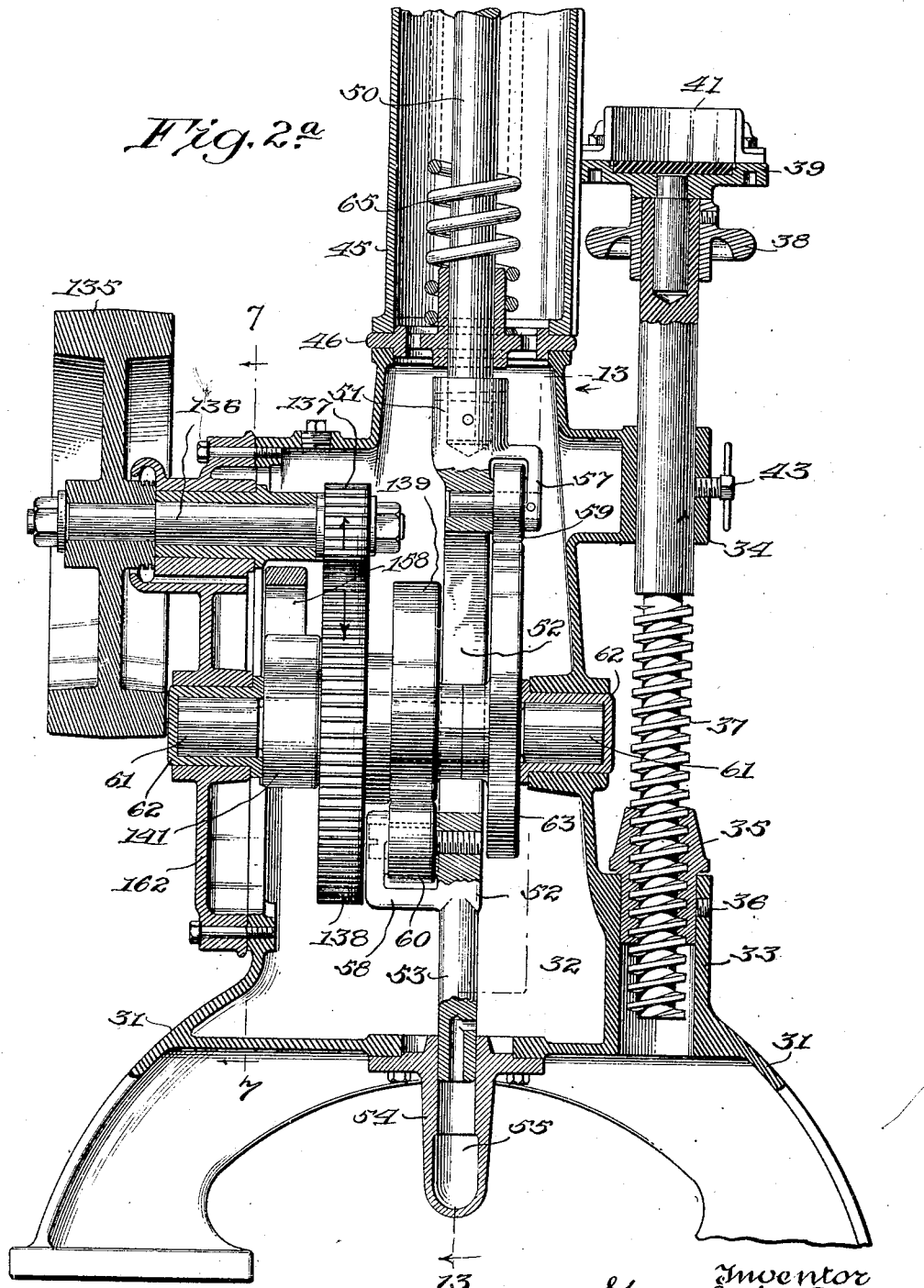
Fig. 2ª

Nov. 13, 1928.

G. J. HUNTLEY 1,691,718

FILLING AND CROWNING MACHINE

Filed Dec. 29, 1921   17 Sheets-Sheet 5

Inventor
George J. Huntley
by Mann & Co.
Attorneys

Nov. 13, 1928.  1,691,718
G. J. HUNTLEY
FILLING AND CROWNING MACHINE
Filed Dec. 29, 1921  17 Sheets-Sheet 7

George J. Huntley
Inventor
by Mann & Co.
Attorneys.

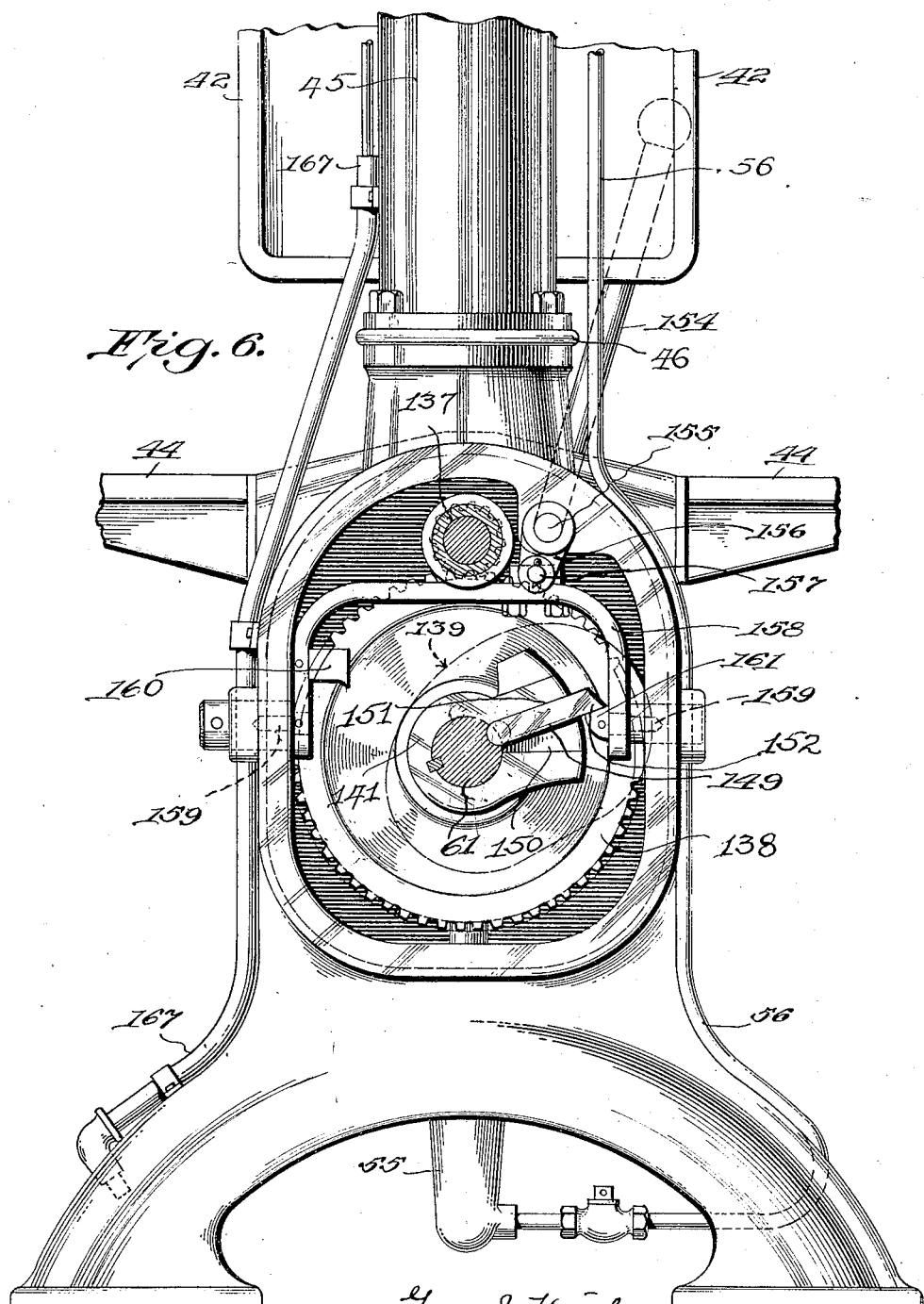

Nov. 13, 1928.  1,691,718
G. J. HUNTLEY
FILLING AND CROWNING MACHINE
Filed Dec. 29, 1921   17 Sheets-Sheet 9
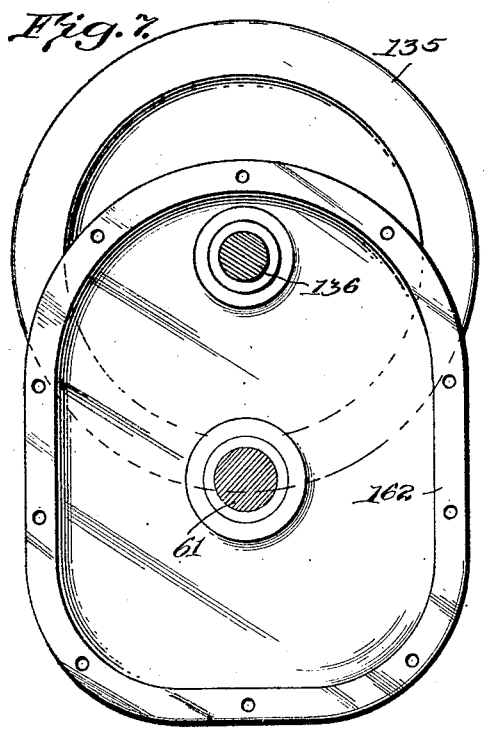
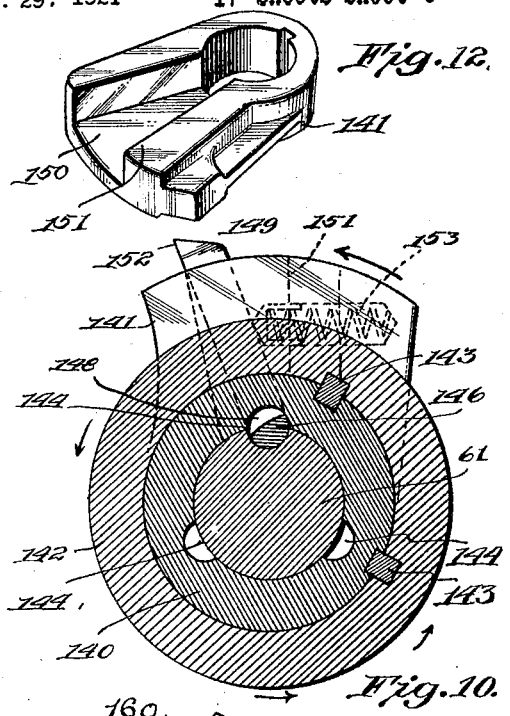

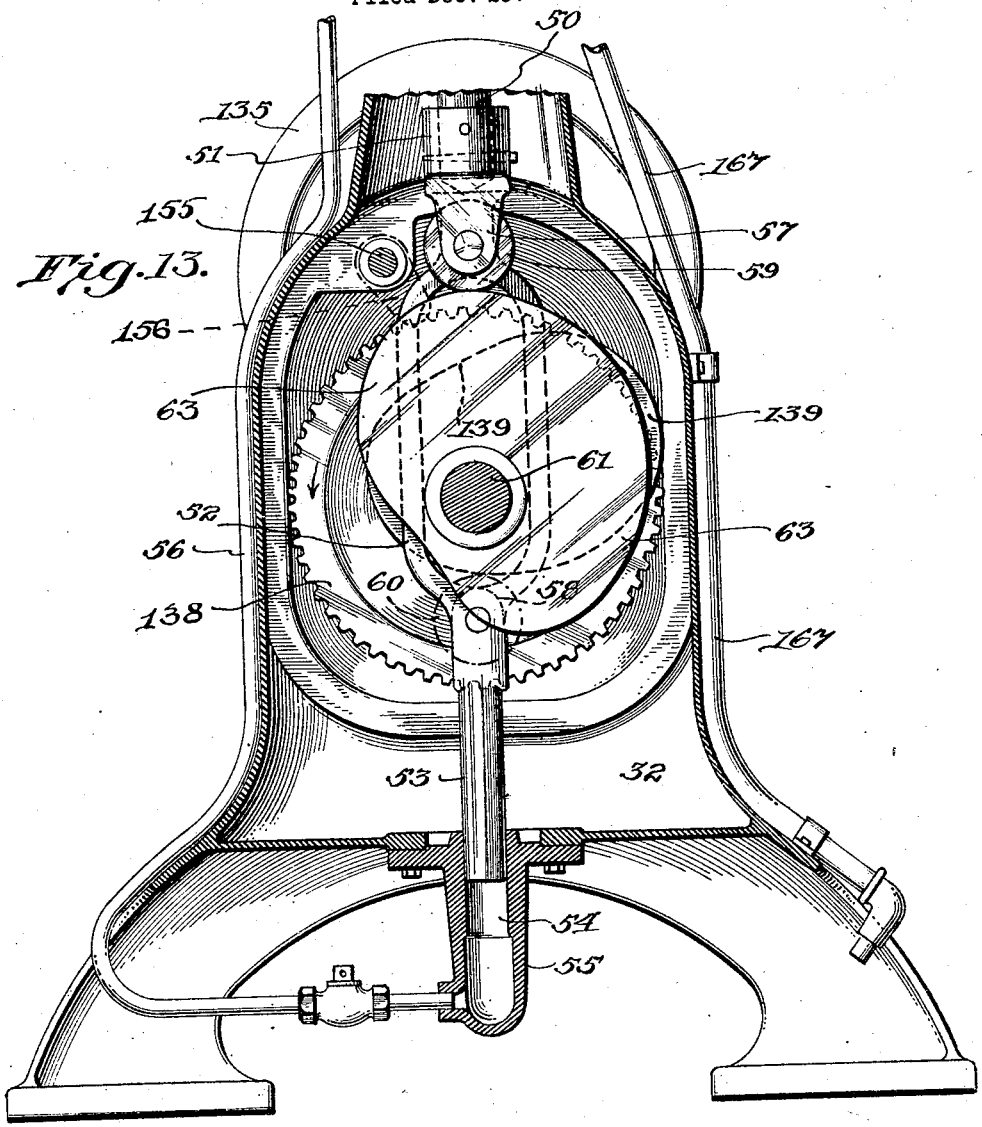

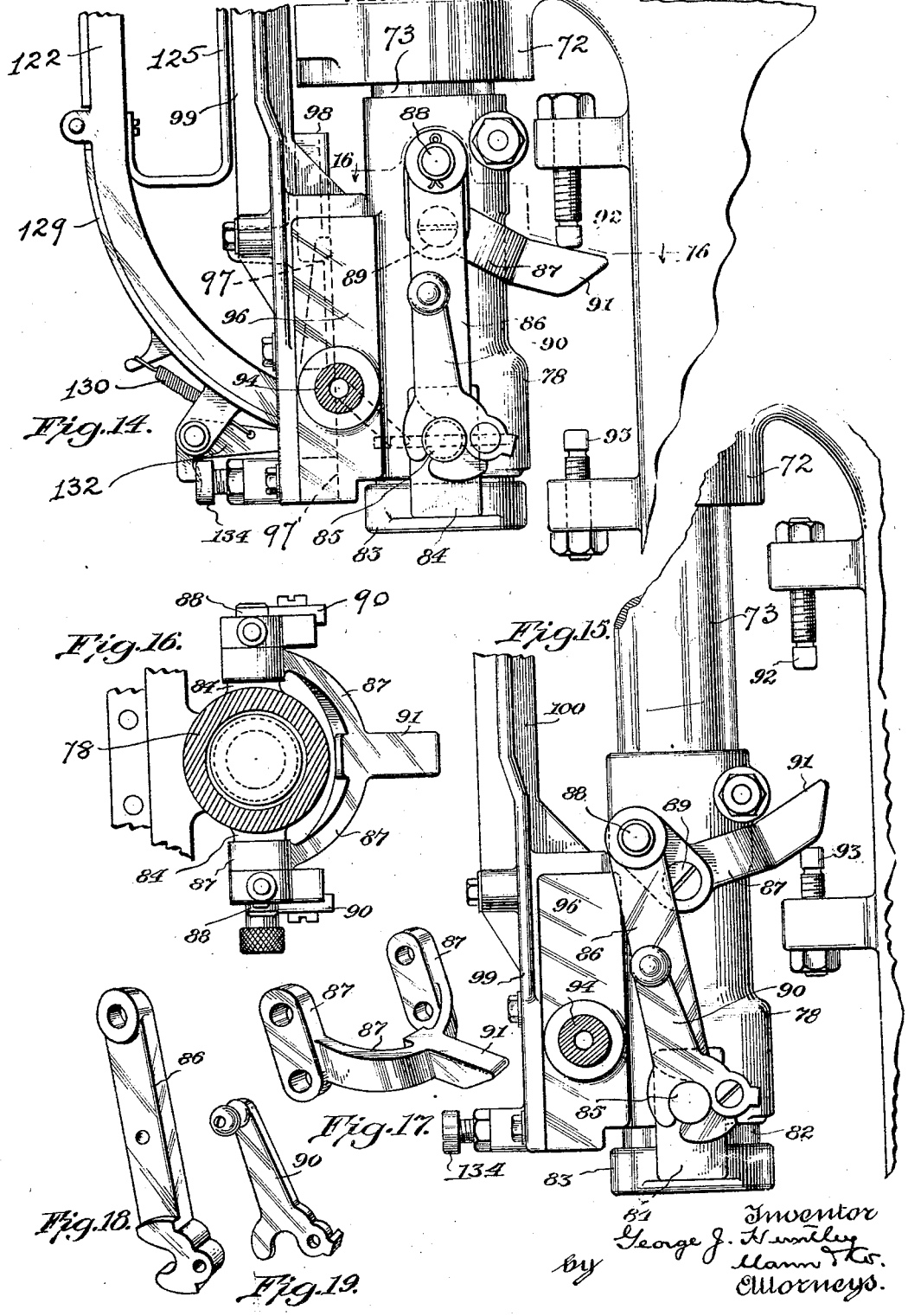

Nov. 13, 1928.
G. J. HUNTLEY
FILLING AND CROWNING MACHINE
Filed Dec. 29, 1921   17 Sheets-Sheet 12
1,691,718
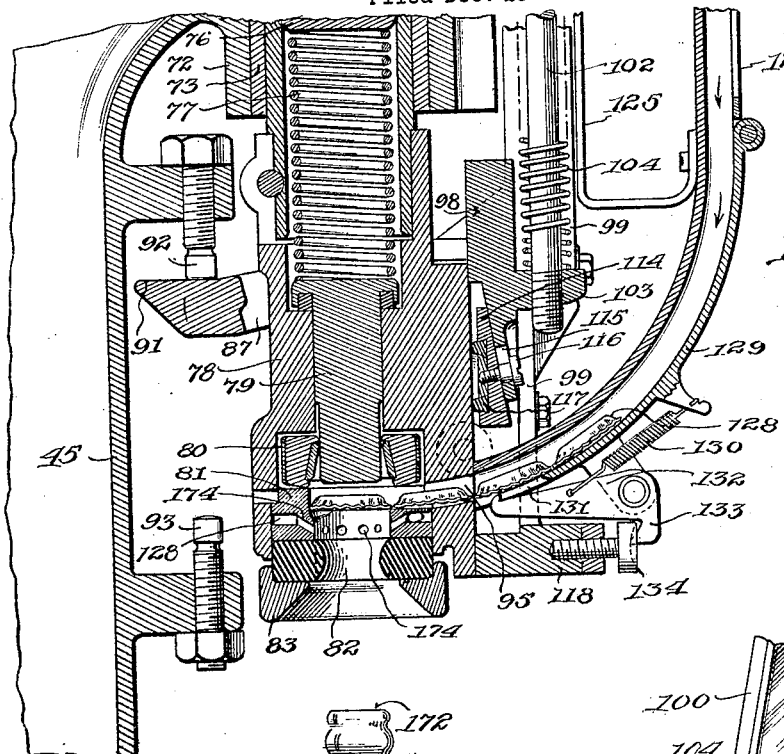
Fig. 20.
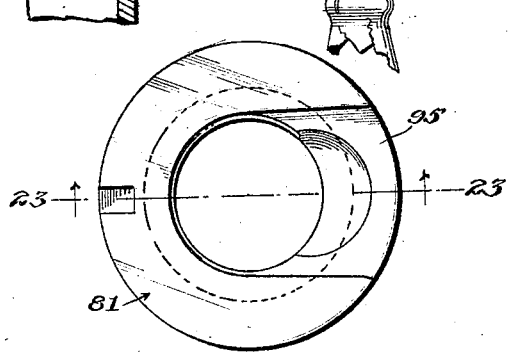
Fig. 22.
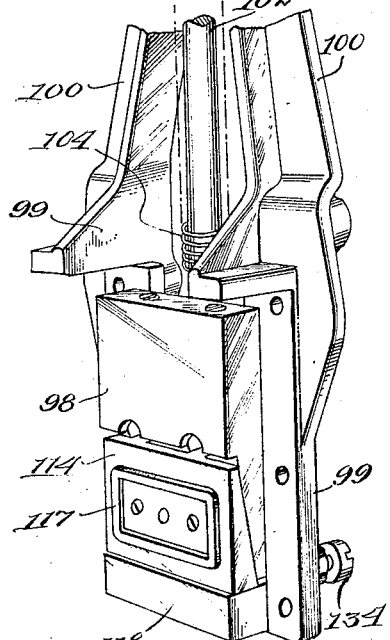
Fig. 21.
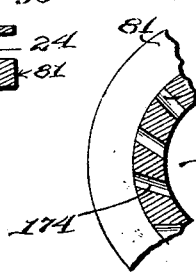
Fig. 23.
Fig. 24.
Inventor
George J. Huntley
Mann & Co.
by
Attorneys.

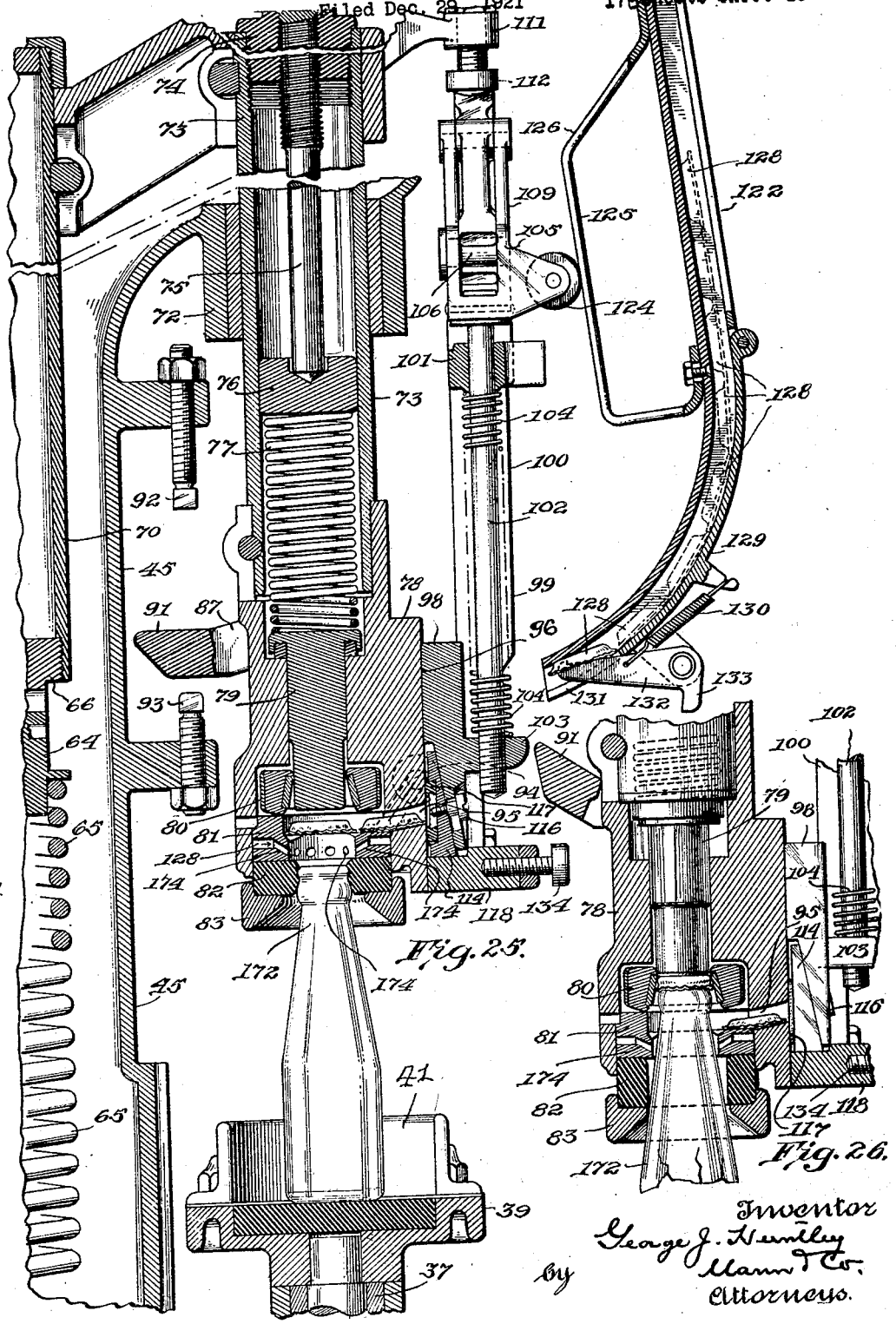

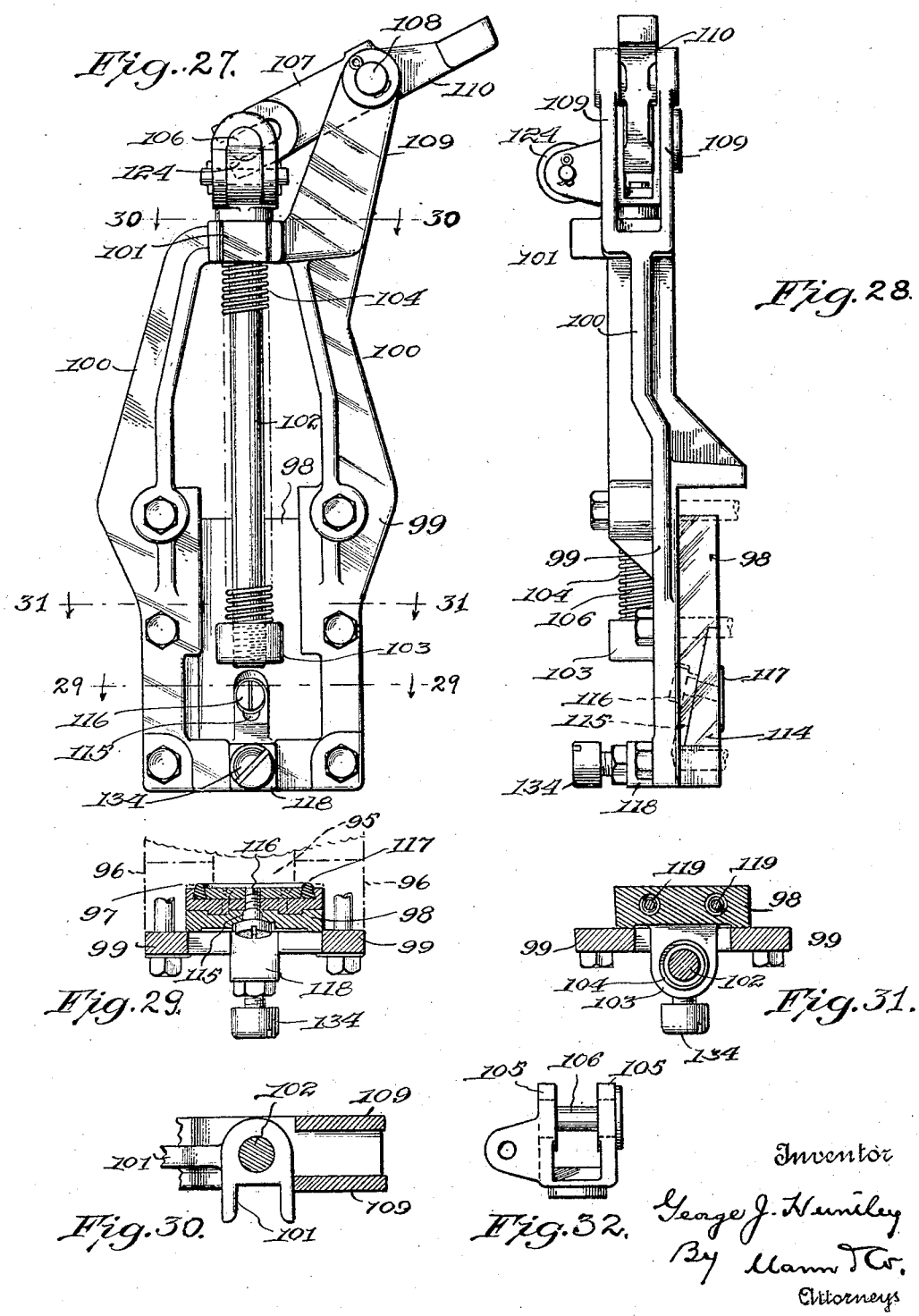

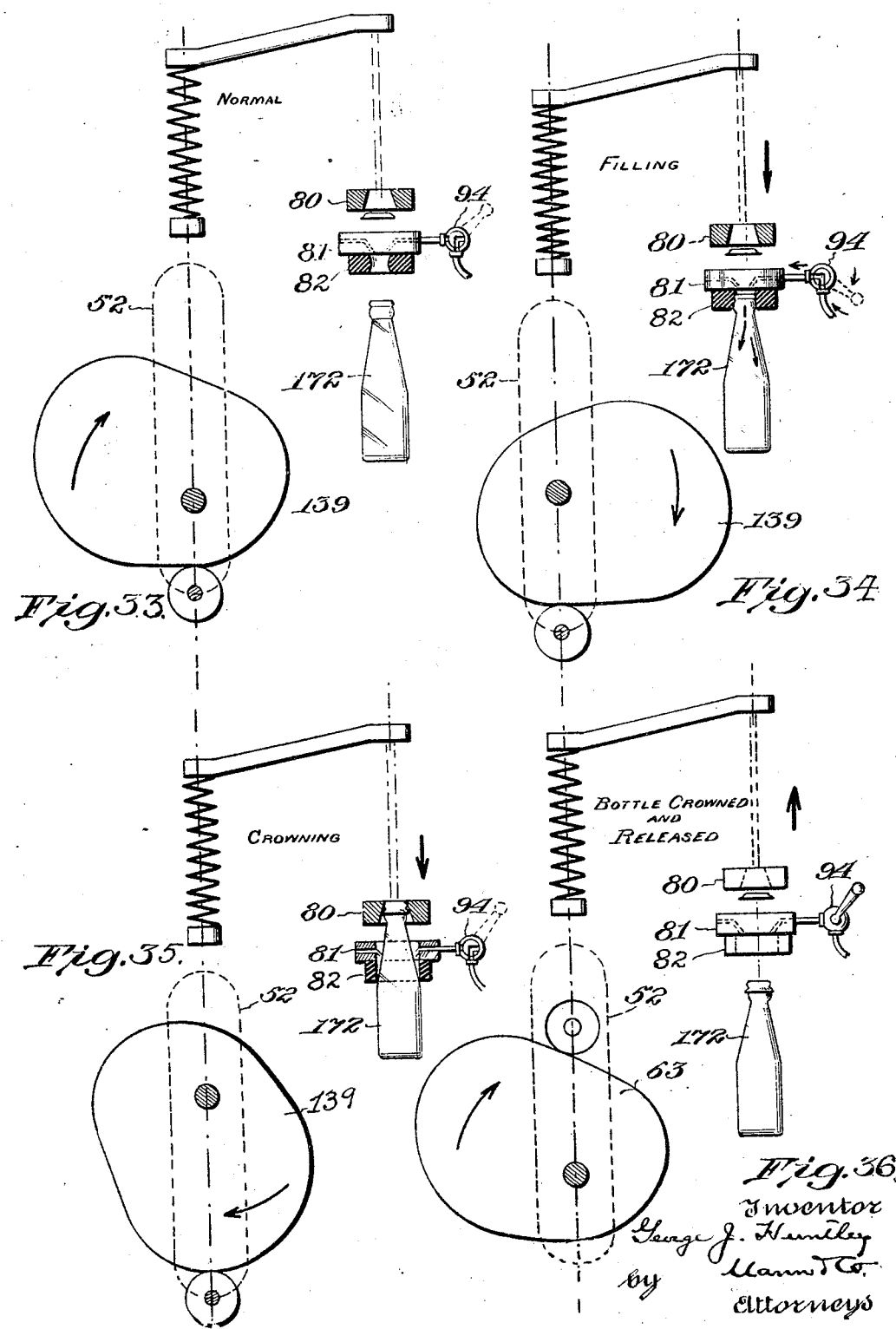

Nov. 13, 1928.  1,691,718
G. J. HUNTLEY
FILLING AND CROWNING MACHINE
Filed Dec. 29, 1921     17 Sheets-Sheet 16

Inventor
George J. Huntley
By Mann & Co.
Attorneys

Nov. 13, 1928.
G. J. HUNTLEY
1,691,718
FILLING AND CROWNING MACHINE
Filed Dec. 29, 1921   17 Sheets-Sheet 17
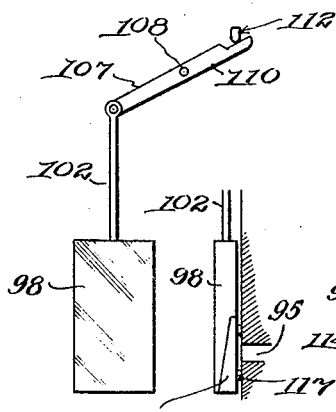
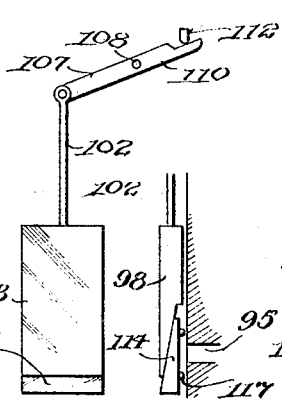
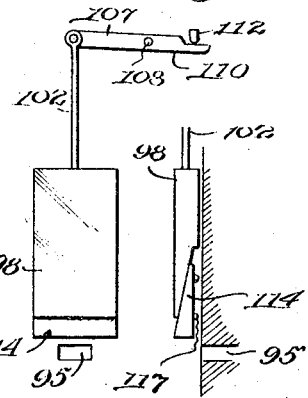
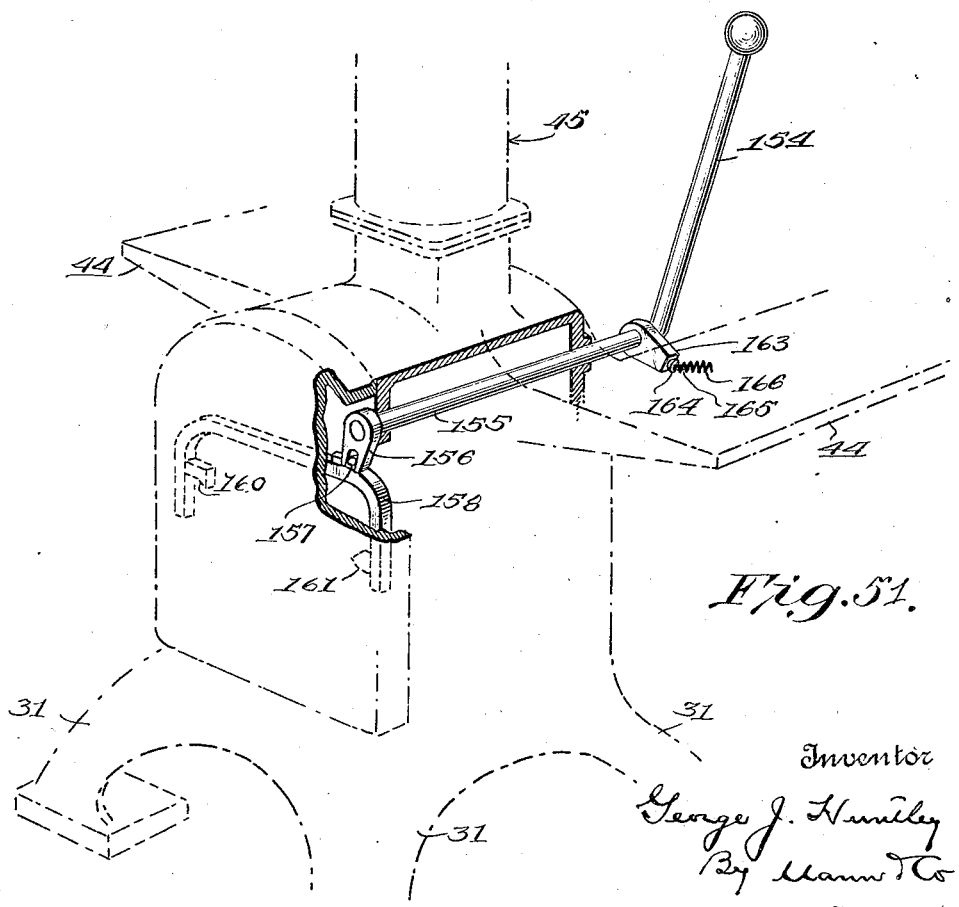

Patented Nov. 13, 1928.

1,691,718

UNITED STATES PATENT OFFICE.

GEORGE JOHN HUNTLEY, OF BALTIMORE, MARYLAND, ASSIGNOR TO THE CROWN CORK AND SEAL COMPANY OF BALTIMORE CITY, OF BALTIMORE, MARYLAND, A CORPORATION OF MARYLAND.

FILLING AND CROWNING MACHINE.

Application filed December 29, 1921. Serial No. 525,544.

This invention has reference to machinery for filling bottles and like containers with fluids and then applying sealing crowns thereto.

The invention of the present application is directed to a filling and crowning machine which is semi-automatic in character and is the first of its kind in the filling and crowning art.

Heretofore, hand and foot-operated machines have been provided and automatic machines have been introduced, but the hand and foot machines fail to meet the demands of a large percentage of bottlers who are unable however to go to the other extreme of installing automatic machines.

In some instances an automatic unit fails to meet the requirements of the bottler and such a unit plus several hand or foot-operated machines are necessary.

The present invention of a semi-automatic machine however, is directed to a filling and crowning machine that will occupy the field that exists between the automatic class and the class of hand or foot machines in that it is manually controlled but power operated, and is automatic to the extent that it will, when started, operate through a portion of its cycle of operation and then automatically stop for an indefinite period and until it is again manually actuated whereupon it will automatically complete the cycle of operation and then again stop.

Prior to this invention no semi-automatic machine of this character was available to the bottler.

The present invention is therefore particularly directed to a filling and crowning machine which has become known to the bottling-trade as semi-automatic; which is designed to supply a predetermined quantity of syrup or flavoring liquid to the bottle or container, then a quantity of carbonated water or other liquid, and finally to seal the bottle or container by applying thereto a sealing crown or cap,—some of the operations being performed by power means but controlled manually in distinction to being entirely automatic or entirely manually operated.

One object of the invention is to provide an improved machine for filling bottles or containers with fluids which shall feed the crowns, and apply the same by power that is manually controlled.

Another object of the invention is to provide improved means for effecting a closure of a gasket about the container during the operation of filling.

A further object is to provide an improved nozzle structure whereby the fluid may be filled into the container without the aid of a vent tube.

A still further object is to provide improved means for closing the cap or crown feed entrance to the head while the filling takes place.

Another object is to provide improved crown-feed chute devices and latch devices to hold the chute.

With the above, and other objects in view, the accompanying drawings illustrate one embodiment of the several features of the invention in a single machine without however, in any way, defining or limiting the scope of invention to the form shown.

In the drawings:—

Figs. 1 and 1a illustrate the improved machine in front elevation, parts of the structure in Fig. 1 however being shown in section.

Figs. 2 and 2a show the same in vertical sectional elevation.

Fig. 3 illustrates the same in sectional plan,—the section being taken on the line 3—3 of Fig. 1a.

Fig. 4 shows another sectional plan of the machine, as the same would appear if cut on the line 4—4 of Fig. 1a.

Figs. 5 and 6 illustrate two views of the hand lever control devices in the two positions they assume and as viewed in elevation from the rear side of the machine.

Fig. 7 shows the back cover for the base or frame as the same would appear if viewed on the line 7—7 of Fig. 2a.

Fig. 8 illustrates a cross-sectional detail through a portion of the cam-shaft and bolt-engaging means,—the section being taken on the line 8—8 of Fig. 5.

Fig. 9 shows a vertical cross-sectional detail through the same as viewed on the line 9—9 of Fig. 8, and shows the driving gear disengaged.

Fig. 10 illustrates a similar view of the same but with the parts engaged to rotate together.

Fig. 11 shows the detached clutch bolt in perspective.

Fig. 12 illustrates the detached clutch bolt driver in perspective.

Fig. 13 shows a vertical sectional elevation through the lower portion of the machine to illustrate certain cams and interior mechanisms in side view,—the section being taken on the line 13—13 of Fig. 2ª.

Fig. 14 illustrates in side elevation the crowning head and the associated parts; the same being in the uppermost position.

Fig. 15 shows in side elevation the throat-gasket actuating devices in the positions they assume when the head is in the lowermost position.

Fig. 16 illustrates a horizontal cross-sectional detail through the crowning-head,—the section being taken on the line 16—16 of Fig. 14.

Figs. 17—18 and 19 show respectively, perspective details of the throat-gasket actuating devices.

Fig. 20 illustrates the parts in and about the crowning-head in vertical longitudinal section.

Fig. 21 shows in perspective, the bracket and port-gasket closing devices.

Fig. 22 illustrates on an enlarged scale a top view of the detached vortex nozzle.

Fig. 23 shows a cross-sectional detail through the same,—the section being taken on the line 23—23 of Fig. 22.

Fig. 24 illustrates a horizontal cross-sectional detail through a portion of the same,—the section being taken on the line 24—24 of Fig. 23.

Fig. 25 shows a vertical sectional detail through the crowning head and associated parts with a bottle in place, and the parts in the position they assume during the operation of filling the bottle.

Fig. 26 illustrates some of the same parts but with the bottle and said parts in the positions they assume during the crowning operation.

Fig. 27 shows in front elevation the slide valve devices for controlling the crown-feed port,—the devices being in the position to seal the port.

Fig. 28 illustrates the same in side elevation.

Fig. 29 shows a cross-sectional detail through the slide valve and block at the crown-feed port while the valve is closed,—the section being taken on the line 29—29 of Fig. 27.

Fig. 30 illustrates the head devices at the upper end of the valve-actuating rod and through which said rod is moved, all as viewed on the line 30—30 of Fig. 27.

Fig. 31 shows a cross-sectional detail through the slide valve devices,—the section being taken on the line 31—31 of Fig. 27.

Fig. 32 illustrates a side view of the detached head on the upper end of the valve-actuating rod.

Figs. 33—34—35 and 36 show four diagrammatic views of the cam-yoke, crowning-head and cam-actuators to indicate the relative positions of those parts when they assume the normal position, the filling position, the crowning position and the releasing position respectively.

Figures 37, 39, 40:
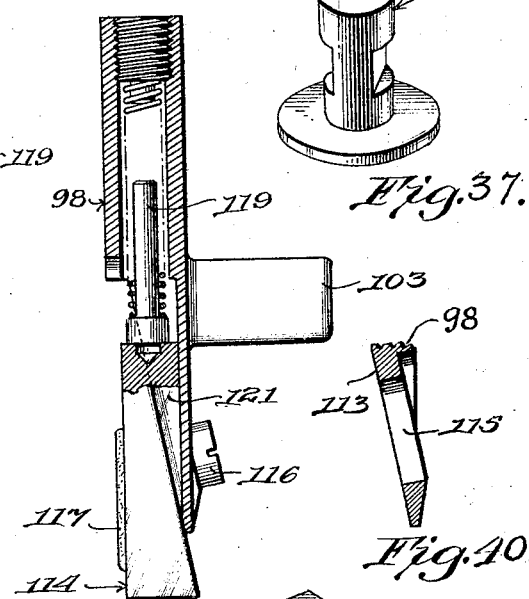

Fig. 37 illustrates a perspective detail of the horizontal cross-pin which extends through the head on the upper end of the valve-actuating rod.

Figure 38:
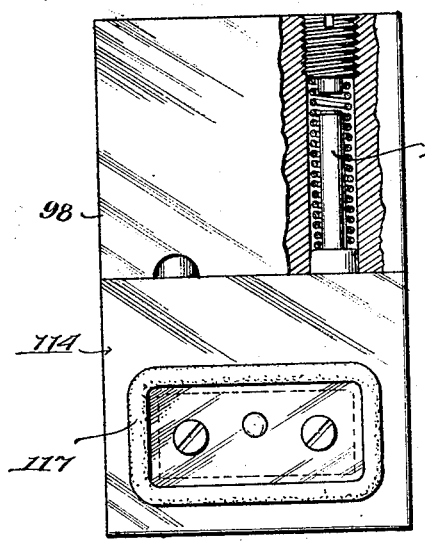

Fig. 38 shows the detached slide-valve block and wedge plate in rear elevation,—a portion of the block being broken away to show how the wedge plate is yieldingly pressed down.

Fig. 39 illustrates a vertical sectional detail through the same.

Fig. 40 shows a sectional detail through a fragment of the slide-valve block to show the inclined slot in the wedge-portion thereof.

Figure 41:
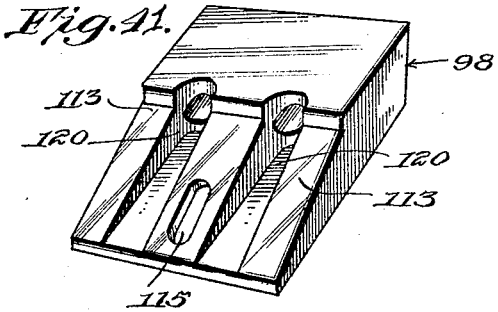

Fig. 41 illustrates the detached slide-valve block in perspective.

Figures 42, 43:
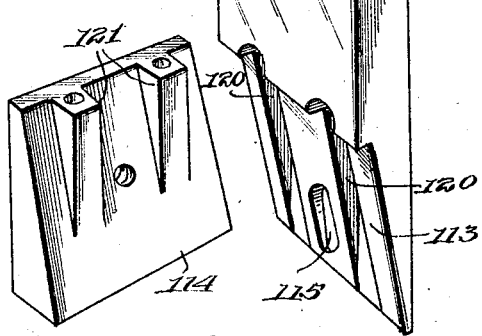

Fig. 42 shows the detached wedge-plate in perspective to show its inclined face and guide ribs.

Fig. 43 illustrates another perspective view of the slide-valve block.

Figure 44:
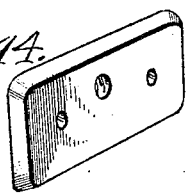

Fig. 44 shows the detached gasket-carrying plate of the wedge-plate.

Figs. 45, 46, 47, 48, 49 and 50 illustrate front and edge views respectively, in a diagrammatic manner, of the slide-valve block and wedge-plate in connection with the crown-feed port, and Fig. 51 shows a perspective detail of the manual-control means by which the power means is controlled.

Referring to the drawing the numeral 31 designates the base or frame which is provided with an interior chamber 32 to contain the driving mechanism, presently to be fully described, and at the front side, this base has a lower bearing-socket 33 and an upper guide-sleeve 34. An interiorly-threaded supporting block or nut 35 fits down into the bearing socket 33 and is locked therein against rotation by a locking-screw 36, which passes through the bearing socket.

A vertical rod or screw 37, has its lower end exteriorly threaded so as to screw into the block 35, and the upper portion of this rod or screw is exteriorly smooth and passes through the upper guide-sleeve 34 so as to project above the latter.

A hand wheel 38, is rigidly secured to the vertical rod or screw so the latter may be readily rotated and thereby be moved vertically in the block or nut to permit it to be raised or lowered so that its upper end may be vertically adjusted where it may be locked in position by a set screw 43.

Figure 4:
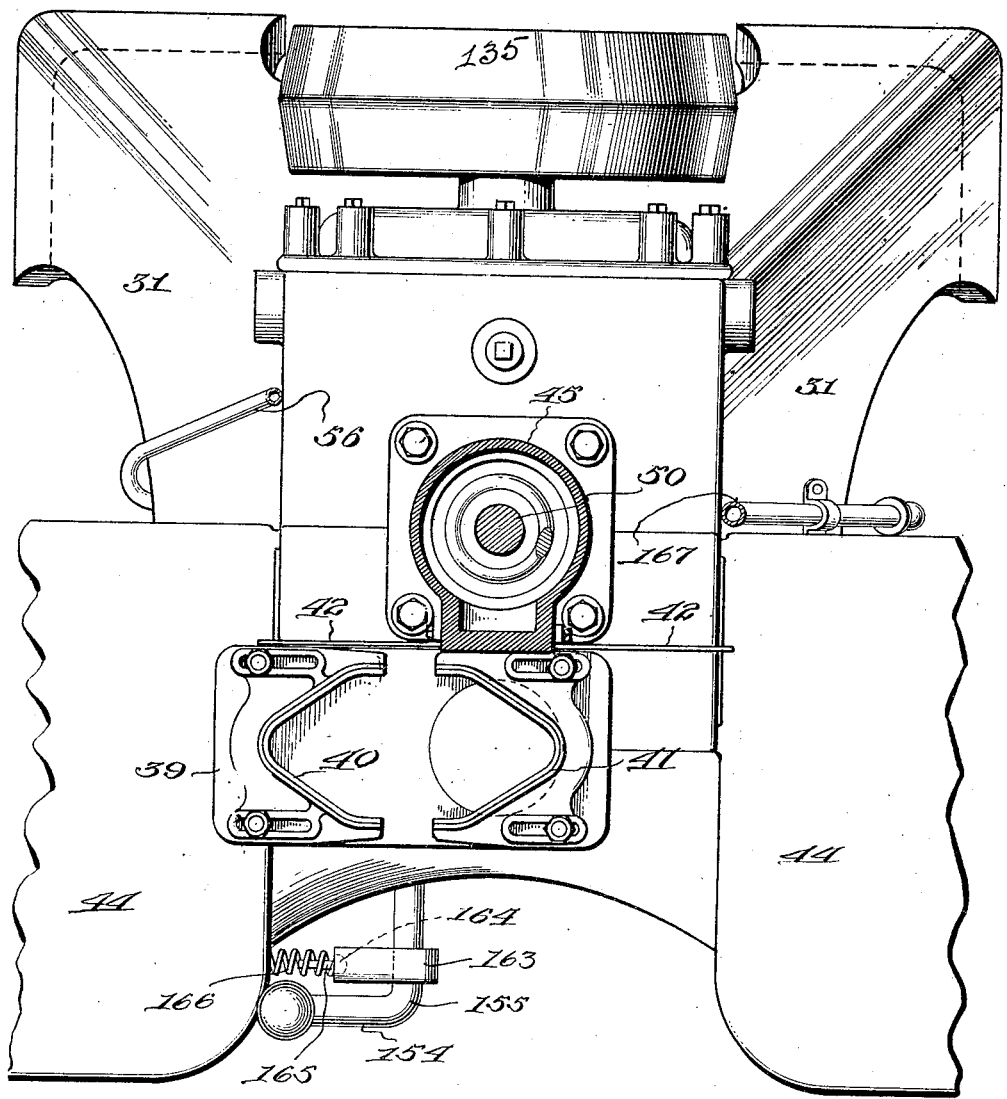

The upper end of the rod or screw 37, sustains a horizontal table 39 whose upper surface is provided with two adjustable bottle-centering devices 40 and 41, which are best illustrated in the plan view of Fig. 4 and whose function will presently be more fully explained.

As the table 39, is carried on the upper end of the rod or screw 37, any vertical adjustment of the latter will obviously effect a similar vertical movement or adjustment of the table.

The table is supported on the upper end of the rod or screw by means of a spindle that projects down into the screw-end so that the table may readily be lifted from the upper end of the screw for cleaning or other purposes, and this table 39 is held against rotation on the screw or rod 37 by its rear edge seating against spaced-apart pads or stops on the frame.

Two guards 42 are attached to the frame of the machine at the rear of the table 39 and another guard may be located in front of the table, whereby to protect the operator from flying glass in case a bottle should break during the crowning operation.

A shelf 44 is sustained by the frame at each side of the rod or screw so that a case of empty bottles may be sustained at one side and a case to receive the filled and crowned bottles may be sustained at the opposite side,—both within convenient reach of the operator.

The machine embodying the features of the present invention is designed to permit one operator to place an empty bottle against the centering device 40 on table 39, where it will be in position to receive a predetermined quantity of syrup or flavoring, to change the bottle previously charged with syrup to the centering device 41 on said table where it will be in position to receive a charge of carbonated water or other liquid, and in which position it remains during the crowning operation, and to also remove the previously-filled and crowned bottle from the latter position to a crate on the right-hand shelf 44.

It is therefore to be understood that, in the present instance the table 39, is stationary; that during the operation of the machine two bottles are supported by the table,—one to receive a charge of syrup or flavoring and the other (having previously been charged with syrup) to be filled with carbonated water or other liquid and then sealed with a crown or cap. These operations are carried out, in the present instance, by moving the syruper and the filling and crowning mechanisms to the bottles:

The specific means employed in the present machine for delivering a predetermined quantity of syrup or flavoring to the bottle form the subject-matter of an application for patent heretofore filed by me in the United States Patent Office and bearing Serial Number 381,600 and the same is not herein specifically described or claimed.

This syruper however will presently be briefly referred to.

By reference to Figs. 2 and 2ª, it will be seen that a tubular column 45 extends vertically from a guide-bearing 46 on top of the base and that at the upper end, the column has a forward extension that forms a housing or casing. This housing or casing has a vertical bearing 72 that overhangs but is considerably elevated with respect to the bottle-table 39, and a horizontal cover 47, is bolted on the upper end of the column and has two bearings 48 and 49 therein as shown in Fig. 2, for a purpose that will presently be explained.

A rod 50, extends vertically through the column and has its lower end projecting through and below the guide-bearing 46 and its upper end projects through and above the bearing 48 in the cover 47.

The lower end of this rod 50 is secured in a socket 51, at the upper part of a cam-yoke 52 which latter is located in the base-chamber 32, as shown in Figs. 2ª and 13 of the drawings.

The cam-yoke 52 has a stem 53 at its lower end which stem projects into a chamber 54 of an oil-pump body 55 in the bottom of the base-chamber 32 and serves as a piston on each downward stroke to force oil up through a pipe 56, to provide lubricant for the movable parts in the upper end of the hollow or tubular column.

The cam-yoke 52 has an upper pin-supporting lug 57, and a lower pin-supporting lug 58, which lugs are spaced from the sides of the yoke so as to permit rollers 59 and 60, to be rotatably carried at the opposite sides thereof, and one above the other.

A horizontal shaft 61, extends across the base-chamber 32 and has its ends seated in bushing-caps 62, which project through the sides of the base, but completely cover the ends of the shaft, whereby to prevent leakage of oil around the shaft-ends to the outer sides of the base.

This cam-shaft 61, carries, what I term, a return-cam 63 whose circumference is so positioned as to be revolved in contact with the upper roller 59 on the cam-yoke and thereby lift said yoke and the rod 50 as it revolves,—the yoke straddling the horizontal shaft 61 and thus being free to move.

By reference to Fig. 2, of the drawings it will be noted that about midway between the upper and lower ends of the rod 50, the latter is provided with a collar 64, which latter is rigidly keyed thereon, and that a balance spring 65 encircles the rod 50 below the collar and has its upper end seated against the lower side of said collar 64, while the lower end of said balance spring is seated on the upper side of the guide-bearing 46, as shown in Fig. 2ᵃ of the drawing.

Immediately above the collar 64 the rod 50 carries a collar 66 while at the upper end of the column said rod is provided with a nut 67 beneath which there is a washer 68.

A crowning compensator-spring 69, encircles the rod 50 between the collar 66 and washer 68 and a cylinder 70 extends from the upper nut 67 to the collar 66 and encloses the compensator spring 69, and rod 50, but said cylinder is disconnected from said rod 50 to permit relative movement of the one with respect to the other, as clearly seen in Fig. 2 of the drawing.

It is therefore to be understood that the collar, nut, spring 69 and cylinder 70 are all enclosed in the column 45.

A bracket 71 is also enclosed in the upper end of the column 45, and is rigidly attached to the cylinder 70, and this bracket extends forwardly over the bearing 72, in the lateral extension of the column. The forward end of this bracket 71, carries a head ram-cylinder 73, which latter extends downwardly through and projects below the bearing 72 as shown in Figs. 2 and 25 of the drawings.

A head ram 74, has an enlarged head at its lower end which screws into and is rigidly engaged with the upper end of the cylinder 73, and the upper end of this head ram, passes through and is guided in the bearing 49 in the horizontal column cover 47.

A crown presser-foot adjusting-rod 75 extends centrally through the head ram 74 and has threaded engagement with the latter and the lower end of this rod 75 is seated on a disk or head 76 which is held in place in the cylinder 73, by said rod 75 and forms an upper adjustable stop or seat in said cylinder for a presser-foot compression-spring 77 which extends up into the lower end of the said cylinder.

The lower end of the ram-cylinder 73 carries a head 78 which latter has a pendant position below the bearing and in front of the column 45. This head has an upper recess and a central passage extending downwardly therefrom, and a crown presser-foot 79, extends vertically through the central passage and has its upper enlarged end held down by the presser-foot compression-spring 77.

The lower end of the head 78 is provided with a bottom recess into which the lower end of the crown presser foot 79 projects, and around said lower end of the presser-foot there is a structure, in said head-recess which I term the throat 80, while beneath the throat there is a vortex nozzle 81.

A rubber gasket 82 is located directly beneath the nozzle 81 and said gasket is seated in a cup 83 which latter has a ring-form so as to permit the passage of a bottle-neck through the cup-gasket and nozzle to the throat.

The cup is provided at diametrically-opposite sides with vertically-projecting lugs 84 (see Figs. 14 and 15 of the drawings)—each having a pin or stud 85 in its side and this cup is suspended by links 86 which are attached to yoke-levers 87 by pins 88. These yoke-levers straddle the head 78, and are pivotally attached thereto at diametrically opposite sides by pins or screws 89 which latter are located in a horizontal plane below the pins 88, to which the links 86 are connected.

Link latches 90, are provided at opposite sides of the head 78 whereby to lock the links 86 to the headed studs 85 on the cuplugs 84, so that a quick detachable structure may thereby be provided.

The purpose of this combination of cup 83, gasket 82, links 86 and yoke 91, is to provide means for supporting and vertically clamping the gasket 82, so that when so clamped, the rubber will be compressed vertically and thereby cause its central annular wall to contract thus requiring the neck of a bottle to be forced therein and thus make a tight closure about the bottle-neck during the operation of supplying carbonated water through the nozzle structure 81 as shown in Fig. 25 of the drawings. The operation of the lever-end 91 of the yoke is effected during its vertical movement with the head 78, by striking an upper stop screw 92 on one movement and by engaging a lower stop screw 93 on its other movement thereby alternately compressing and releasing the rubber gasket,—the latter being compressed when the head comes down to receive the empty bottle. The supply of carbonated water, in this instance, is controlled through a hand-operated valve 94 which communicates with the nozzle structure 81, and obviously, when the charge of water is being supplied to a bottle, the gasket 82 must be closed about the bottle-neck and at the same time a port 95, which is provided at the upper side of the vortex nozzle 81 for the entrance of crowns, must be closed to prevent the escape of the water or other liquid that is being filled into the bottle. These features and structures will therefore now be explained, reference being made particularly to Figs. 1—2 and 20 to 26 inclusive, of the drawings.

On the front side of the head 78, where the crown-feed port 95 opens, I provide an enlargement 96, which latter in this instance is integrally formed on the head and has movement only in a vertical direction with the head.

This enlargement 96, has a vertical guide recess 97, in its front side which recess extends from top to bottom of the enlargement, and in this vertical recess there is located a slide-valve block 98, which latter is designed to be moved vertically in the guide recess, and during such movement, to either open or close the entrance to the crown-feed port 95.

The slide-block 98 in this instance, is held in place in the recess 97 by means of a bracket plate 99, which is best illustrated in Figs. 1—14—15 and 21 of the drawings,—said bracket plate seating against the front side of the block 96 and slightly overlapping the front face of the slide valve block 98.

The bracket plate 99, has upwardly-extending arms 100, which form a vertical guide bearing 101 at their upper ends so that a vertical rod 102, may pass down through said bearing 101 and have its lower end screwed into a threaded opening in a lug 103 that projects outwardly from the front side of the slide-valve block 98, as clearly shown in Figs. 25 to 28 of the drawing.

It is therefore to be understood that the rod 102, has its lower end connected to the slide-valve block 98, while its upper end passes freely through the guide bearing 101.

A coiled spring 104, encircles the rod 102 and has its lower end seated on the lug 103 of the valve block and its upper end is seated under the bearing 101 so that the spring constantly tends to press the slide valve-block down in the recess 97 and toward the entrance to crown-feed port 95.

In the operation of this machine the head 78, is moved vertically with respect to the bottle-supporting table 39,—a preliminary downward movement being given to the head to first effect an engagement with the bottle-neck, so that a supply of carbonated water or other liquid may be supplied to the bottle, which latter has previously been supplied with a charge of syrup.

Therefore, before the head has been moved fully to the end of its preliminary downward movement, the crown-feed port 95, must be closed, otherwise, the water supplied through the vortex nozzle 81, would escape through the crown-feed port. For this reason, the slide valve 98 must make its downward stroke to seal or cut off the entrance to the crown-feed port while the head is being lowered.

It is to be understood that the block 96; the slide valve 98; bracket 99 and rod 102, all move vertically with the head 78 so that some means must be provided for moving the slide valve 98, faster than its mere movement with the head.

To effect this, the upper end of the rod 102 carries a head 105, in which there is a horizontal cross-pin 106, and a lever 107, is pivoted at 108 to an arm 109, that projects from one of the bracket-arms 100, and said lever has one end that is bifurcated so as to receive the pin 106 while the opposite free end 110 of said lever projects laterally so it may be engaged by an actuating device as and for a purpose that will now be explained, reference being made particularly to Figs. 1—25 and 27 to 30 of the drawings.

It has just been explained that the lever 107 has one end attached to the pin 106 of head 105 on the upper end of valve-actuating rod 102 while the opposite end 110, of said lever is free. It is this free end therefore that is to be engaged so as to effect a movement of the rod 102, in addition to the vertical movement it gets by traveling vertically with the head.

It is to be understood that not only does the valve 98 and rod 102 move vertically with the head but that the bracket 99—100 and the arm 109 and lever 107 all move with and when the head does.

It will be noted that the tendency of the spring 104 is to press the rod 102 down and also to keep the free end 110 of lever 107 up, but if said free end 110 of the lever is depressed then the rod 102 will be lifted against the force of the spring.

Figure 1:
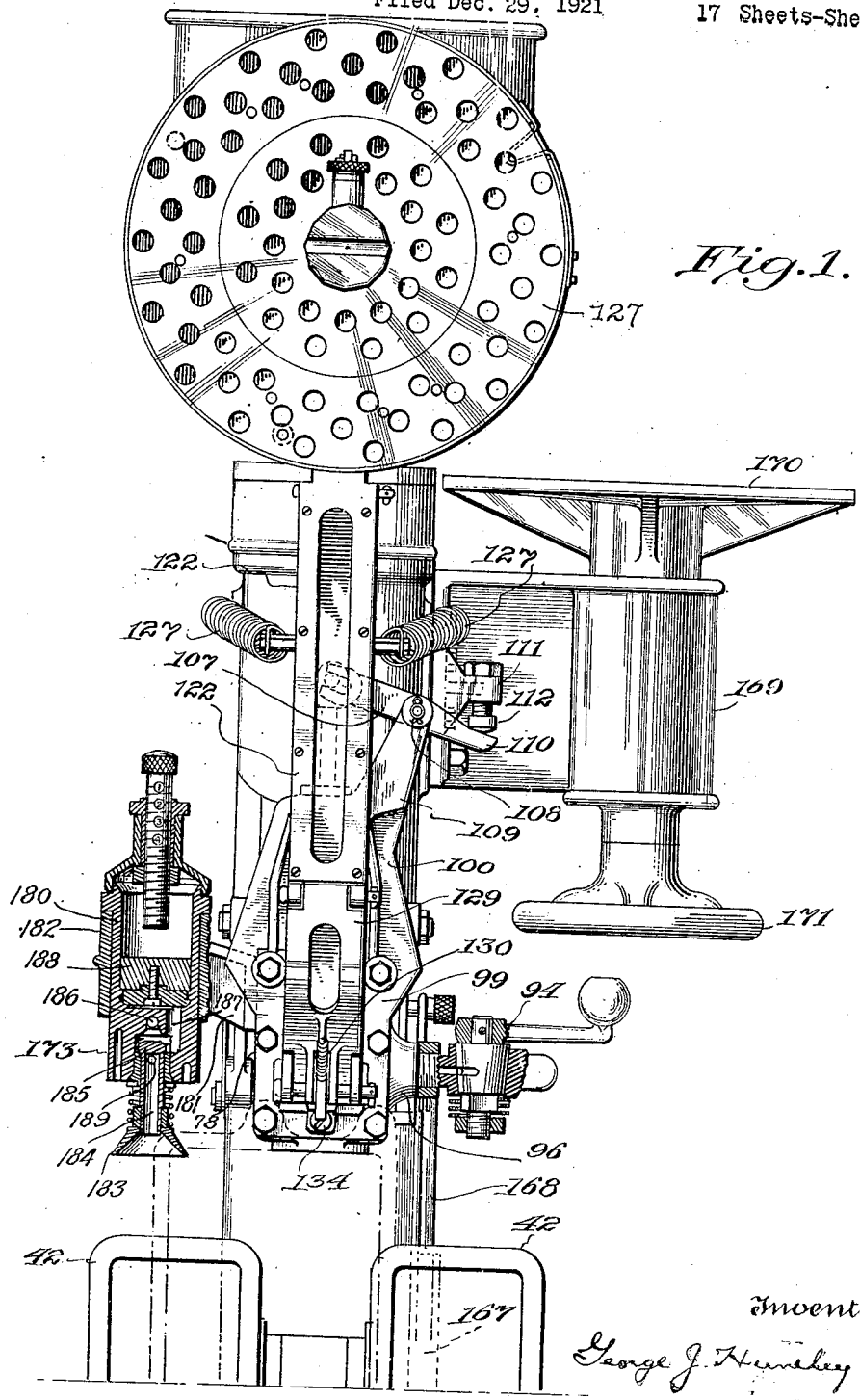
Figure 3:
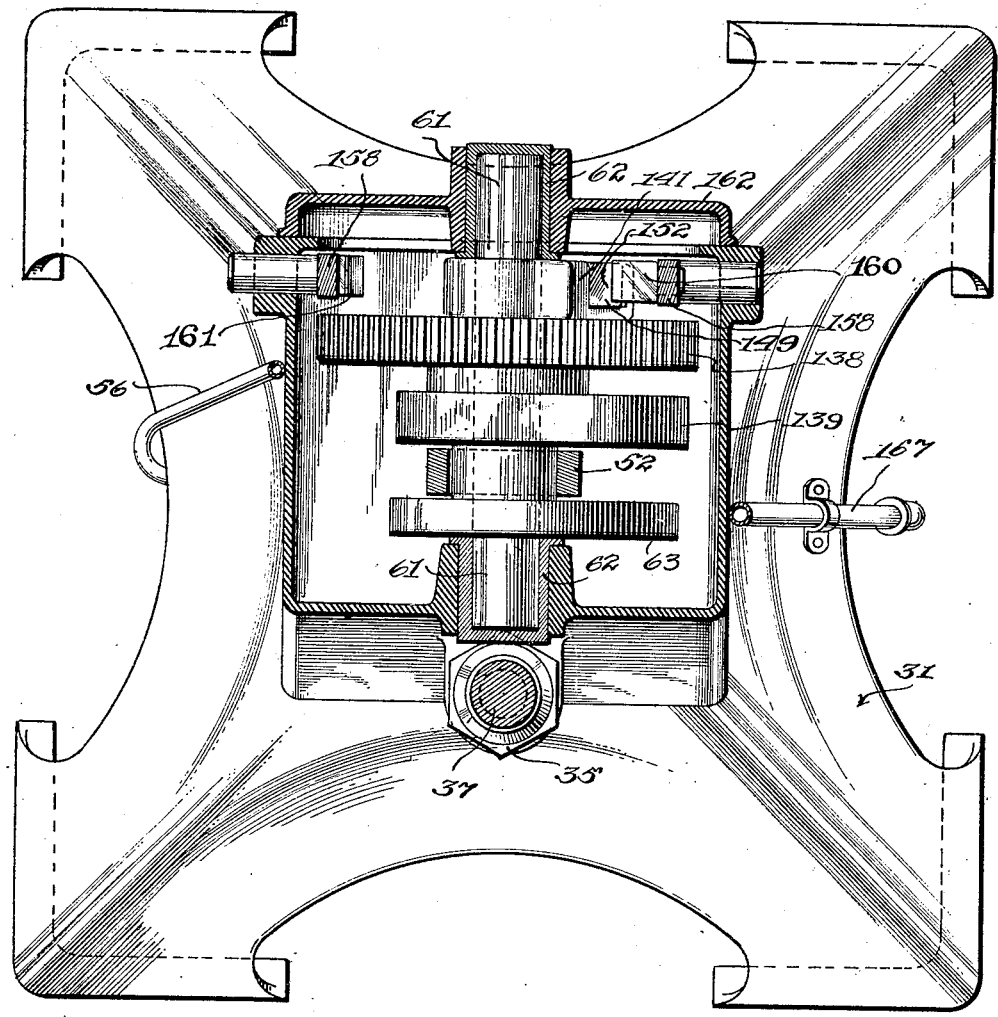

By reference to Figs. 1 and 25 of the drawings it will be seen that a bracket 111 is rigidly carried on the side of the stationary tubular column and therefore has no movement whatever. This bracket sustains an adjustable stop-screw 112, and the position of this stop-screw is such that when the head 78 is nearing the completion of its up-stroke the free end 110 of lever 107, which latter at that time will travel upwardly with the head, will strike the stop screw and be halted in its upward movement while the head 78 continues its said upward movement. This halting of the free end 110 by its engagement with the stationary stop screw 111, causes said lever to rock on the pivot 108 as the upward movement of the head 78 continues, and by thus rocking will swing the opposite end thereof upwardly and thus lift the head 105 and rod 102 rapidly so as to raise the valve 98 and uncover the crown feed port rapidly.

The slide valve 98, has a novel construction in that it is so designed that it may be moved rearwardly to make a tight closure about the crown-feed port in addition to its vertical movement to fully uncover or to fully cover said port.

It is essential to make a tight seal about the crown-feed port because in filling carbonated liquids into a bottle there is a pressure to contend with and maintain and the crown-feed port must be effectually sealed or such pressure will be seriously reduced during the filling operation.

To effect this sealing of the crown-feed port 95, the slide-valve 98 has a wedge face 113 at its inner lower side and a wedge-plate 114 is seated against this wedge face so that the valve 98 may have a slight movement in a vertical direction independently of the wedge-plate and, during that independent movement, cause the plate 114, to move laterally, in a rearward direction and toward the crown-feed port 95, when the valve 98 in moving downwardly.

This lateral movement of the wedge plate 114 is facilitated in this instance by providing a slot 115, in the lower front side of the slide valve 98 through which a headed screw 116 freely passes and screws into the wedge plate, the base of the slot being inclined so as to extend at a right angle with respect to the wedge face 113, and thereby cause the wedge-plate to move laterally as the two wedge-faces slide one against the other.

The inner face of the wedge-plate 114 carries a gasket or packing 117 which when the plate moves toward the crown feed port 95 will seat around said port and effect a tight joint around the same and thereby prevent the escape of the liquid or carbonated water from said port.

The wedge-plate normally has its lower edge projecting slightly below the lower edge of the slide-valve block 98 so that when the block descends, moving the wedge-plate 114 with it, the projecting lower edge of the latter will seat on a stop plate 118 at the lowermost limit of its stroke and thus be stopped from further downward movement, whereupon as the slide-valve block 98 continues its downward movement, the beveled face 113, on the block will engage the beveled face on the wedge plate and thus cause the latter to move laterally and seat its gasket or packing 117 around the crown-feed port 95.

To facilitate the lateral withdrawal of the wedge-plate from the crown-port 95, as the block 98 moves upwardly, I provide a plurality of spring-pressed stems 119 which are carried in the slide-valve block 98 and the lower ends of these stems press down on the upper end of the wedge-plate so as to hold it down momentarily while the bevel faces are separating, but when the screw 116 is engaged by the lower end of the slot wall 115 in the block 98, then the wedge-plate is positively lifted, at which times the beveled faces are sufficiently separated to allow the plate to move outwardly as well as upwardly.

In the present instance I provide an arrangement of vertical guide grooves 120 and guide ribs 121, on the adjacent contact faces of the block 98 and wedge-plate 114, whereby to ensure vertical alinement of those parts during their vertical movements.

Crown feed chute.

The crowns or caps for sealing the bottles are carried in a suitable hopper and agitator from which they are fed downwardly through a guide-chute 122 in a single row. The lower end of this chute terminates at or adjacent to the crown-feed port 95 in the side of the head 78, but is arranged to be moved toward and from the said port so that it will be in register with the port when the crowns are fed but will be moved away from said port during the filling and actual crowning operations and while the crown-feed port is closed by the slide valve.

As the movement of the crown chute is necessary to permit the slide valve to move to close the port and then move to open the port, I find it quite convenient to make use of the port-closing devices as a means for actuating the crown-chute 122.

Referring to Figs. 2—20 and 25 of the drawings the crown-chute actuating devices will now be explained.

The crown-chute 122, has its upper end pivotally connected at 123, to the base of the hopper, as disclosed in Fig. 2, from which point it hangs pendantly.

The lower end of the chute curves rearwardly toward the head 78, and when said head is in its uppermost position as shown in Figs. 2 and 20, this lower curved chute-end registers with the entrance to the crown-feed port 95.

At this time, the slide valve 98 and its wedge-plate 114, are both raised also as shown in said Figs. 2 and 20, and of course, the rod 102, which actuates said valve 98 will also be elevated at this time.

The head 105, on the upper end of the rod 102, carries a roller 124 at the front thereof, which roller has position at the rear side of the crown-chute and travels vertically with the crowning head 78 and slide valve and is also subject to the additional movement imparted to rod 102, through the lever 107, and stop screw 112.

The inner side of the pendantly-sustained chute 122, carries a cam-bar 125, whose upper face 126 is downwardly and rearwardly inclined.

When the crowning head 78 is in the uppermost position, as clearly shown in Fig. 2 of the drawing, the roller 124 is located above the inclined face 126 and out of contact therewith and at this time the chute is in position to feed crowns to the port 95.

When the head begins its downward movement however and starts its preliminary movement toward its filling position, the roller 124, immediately engages the inclined face 126 of the cam-bar and swings said bar and the crown-chute which carries it, outwardly, thereby withdrawing the lower end of the chute from the crown-feed port 95 and in fact swinging said lower chute-end laterally and out of the vertical path of the port-closing devices, as clearly shown in Fig. 25 of the drawings.

Springs 127 yieldingly draw the chute toward the head 78, but yield when the roller 124 presses said chute outwardly.

During the operation of the machine the chute 122 is kept filled with crowns 128, and sometimes the crowns become clogged or lapped in the lower end of the chute. To permit access to these crowns, I provide the lower end of the chute with a hinged front plate 129, which is normally closed and this plate may be swung outwardly and access to the lowermost caps thus gained.

While the lower end of the chute is swung outwardly and away from the crown-feed port 95, it is necessary to provide some means to prevent the row of crowns from sliding downwardly and outwardly from the chute-end.

To prevent this the curved plate 129 has a slot 131 and a pawl 132, is pivotally carried by the plate 129, so that its free end may enter said slot and engage and hold the lowermost crown in the chute. This pawl is engaged by a spring 130 which draws its free end upwardly into engagement with the crowns, but this upward movement can only take place when the chute is moved outwardly and away from the crown-feed port 95, because of a lug 133 on the pawl that engages an adjustable stop screw 134, as the chute swings into register with the crown-feed port and by engaging said screw, the lug is swung forwardly and its free end thereby moved downwardly and withdrawn from the slot 131 so as to release the lowermost crown in the chute.

*Driving mechanism.*

Any suitable means may be provided to drive the mechanisms of the machine, but in the present instance, I show a pulley 35, on the outer end of a horizontal shaft 136, as shown in Fig. 2ᵃ of the drawing. This shaft, in this instance, is located in a horizontal plane above the shaft 61 and carries a pinion 137 at its inner end which pinion meshes with and drives a large gear 138, that revolves about the lower horizontal shaft 61, as will presently be explained.

The shaft 61, carries what I call the head crowning-cam 139; a head return-cam 63; a gear-bushing or liner 140, and a clutch-bolt-driver 141.

The gear-bushing or liner 140, as shown in Figs. 8—9 and 10 of the drawings, encircles the shaft 61 and is itself encircled by the hub 142, of the large gear 138. This bushing is therefore interposed between the gear 132 and the shaft 61, and is permanently keyed to the gear by means of suitable keys 143.

The gear 138 is constantly driven by the pinion 137 and this means that the bushing 140 is contantly revolved because it is keyed to the gear.

The object in interposing this bushing between the gear 138 and shaft 61, is that I provide a clutch device to engage and disengage the shaft with this gear and I find it economical to prepare the bushing with the means for the engagement of the clutch device rather than to form that means in the hub of the gear. By this means I am also able to readily renew the bushing in cases of wear rather than be compelled to renew the entire gear.

The bushing 140, closely encircles the shaft 61 but may freely turn thereon when disengaged therefrom, and on its inner circumference I provide this bushing with three semi-circular cross-grooves or ways 144, as clearly shown in Figs. 9 and 10 of the drawings. It is to be understood that these cross-grooves or ways 144, extend through the entire width of the bushing.

The shaft 61, has a longitudinally-extending circumferential way or recess 145 which is of sufficient length to extend through the clutch bolt-driver 141,—the bushing 140, and well under the crowning cam 139, as can best be seen in Fig. 8, of the drawings.

In this shaft recess or way 145, I locate a clutch-bolt 146, the same being illustrated in Figs. 8 to 11 inclusive, and this bolt has a notched-out portion 147, along the outer side of its circumference which notch is of a length that is equal to the width of the bushing 140, leaving a shoulder 148, at each end of the notch.

One end of the clutch-bolt 146 carries a laterally-projecting arm 149, and this arm extends radially from the shaft 61 and is retained in a V-shaped recess 150, in the side of the clutch bolt-driver 141,—the recess having a stop-shoulder 151, at one side thereof. It is to be understood that the clutch bolt-driver 141, is mounted on the shaft 61, and is keyed thereto, and that the arm 149, of the bolt 146 may be given a swinging movement in the side recess 150 thereof. This arm is of such length that its end 152, will project slightly beyond the end of the recess as the bolt and driver turn together, and this projecting end 152, is utilized to effect an oscillating movement of the bolt to engage or disengage the bushing 140 with or from the shaft 61 as will presently be explained.

The clutch bolt-driver 141 is provided with a socket in the shoulder side 151 and a spring 153 is held in said socket and constantly presses against the side of the clutch-bolt arm 149 and tends to press the latter away from the shoulder to the position shown in Fig. 10 of the drawing,—which position is the locking or driving position of the bolt with the bushing, so as to cause the bushing and shaft to move together in the direction the gear 138 and its hub 142 are traveling.

By reference to Figs. 8—9 and 10 of the drawings the action of the clutch-bolt 146 will be explained without regard, at this moment, to the means for controlling it during the operation of the machine in practice, as this latter mechanism will presently be described.

It will be noted that in Fig. 9 of the drawing, the arm 149 of the bolt 146, is shown pressed toward the shoulder 151 of the bolt-driver 141. When in this position the edge of notch 147 of the bolt will entirely clear the semi-circular cross-grooves or ways 144, across the inner circumference of the bushing 140, so that the bushing may revolve with the gear 142—138 without turning the shaft 61.

This revolution of gear 138 is continuous, regardless of whether the crowning head 78 is in motion or is idle, but when the said head is idle or at a standstill, the clutch bolt 146, must be in the position shown in Fig. 9 so the bushing can revolve without turning the shaft 61.

The moment, however that the free end 152 of the arm 149 of the clutch-bolt is released,— the spring 153 will press the arm laterally in the recess 150 of the clutch bolt-driver 141 which lateral movement of said arm will cause the bolt 146 to rock in the shaft-groove or way 145, and thus cause the bolt to turn outwardly from the shaft and enter one of the cross-grooves 144 in the bushing, and, by so doing, lock the bushing 140 and shaft 61 so they will revolve together,—the locking position of the bolt being clearly shown in Fig. 10 of the drawing.

With this understanding of the action of the locking-bolt, it will now be explained how, and by what means, the arm-end 152 of the bolt is actuated in practice, reference being made to Figs. 1ᵃ—5, 6 and 51 of the drawings.

At the front of the machine there is provided a control lever 154 which latter is merely the up-turned end of a horizontal rock-shaft 155. This rock-shaft extends through the casing above the cams and gears and has bearing in the rear side of the casing at one side of the driving or pinion-shaft 136. An arm 156 is carried on the rear end of this shaft and this arm depends from the shaft and its lower end is slotted or bifurcated. This slotted or bifurcated arm straddles a horizontal pin 157 that extends rearwardly from a clutch trip-yoke or frame 158, which yoke has position in a vertical plane at the rear side of the gear 138, and bridges or extends over the clutch bolt-driver 141, which position can readily be noted by reference to Fig. 6 of the drawing. The clutch trip-yoke is provided at each of its depending lower ends with a pin 159 which pins extend laterally toward the opposite sides of the casing and freely enter sockets therein so they may be horizontally reciprocated with the yoke.

The arrangement of the yoke; the arm 156 and the shaft 155 are such, that when the lever 154 is moved to the left, as in Fig. 1ᵃ it will cause the yoke or frame 158 to move laterally to the right, and when said lever is moved toward the right it will cause the yoke or frame to move toward the left.

Figure 5:
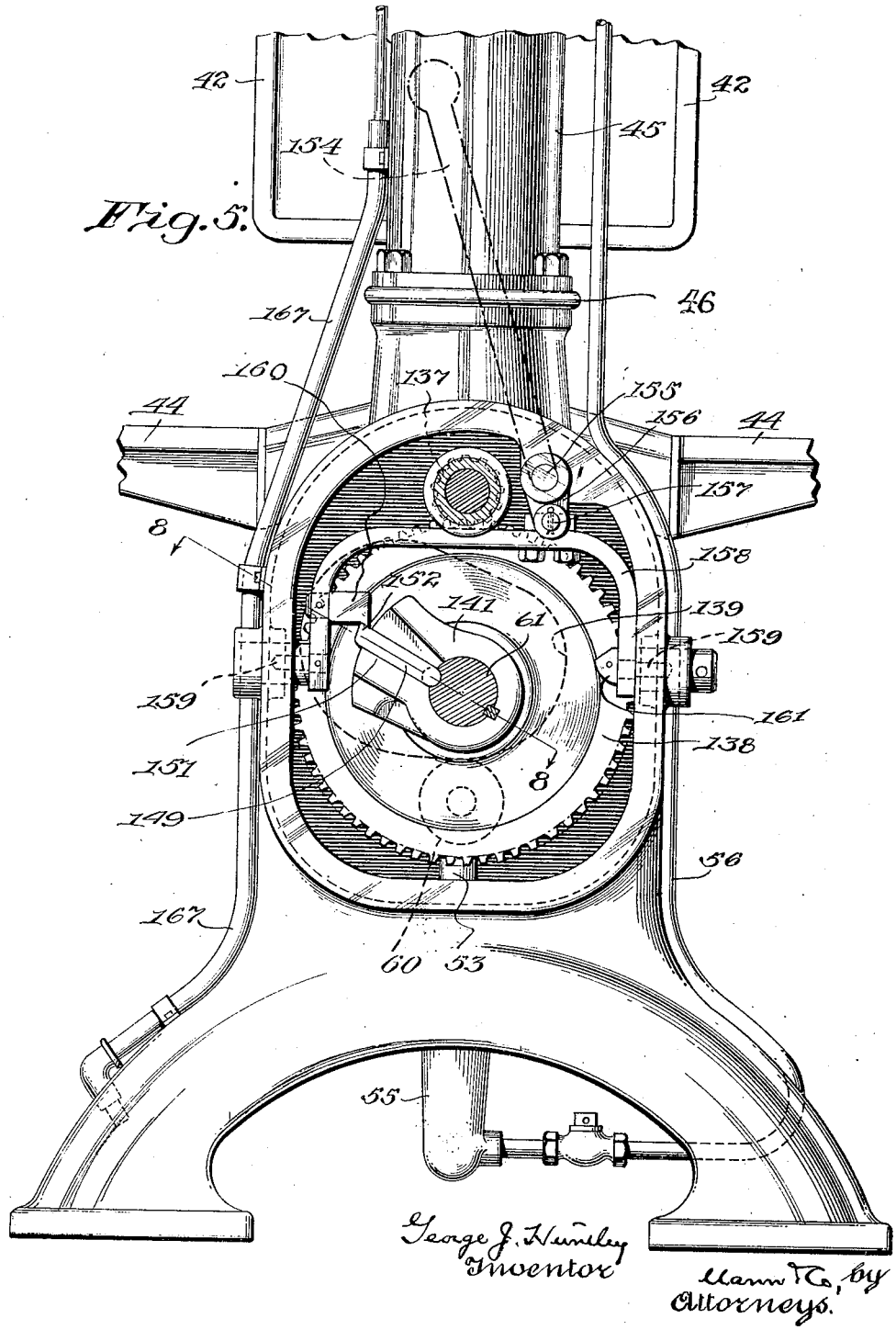

The two Figs. 5 and 6 show views of the yoke and the lever as seen from the rear of the machine, whereas in Fig. 1ᵃ the lever 154 is viewed from the front of the machine, hence in looking at Figs. 5 and 6 this change in the positions of the frame must be remembered.

By reference to Figs. 5 and 6 it will be noted that one side of the yoke frame is provided with a stop-lug 160 with a beveled face on its under side and that the opposite side of the said frame has another stop-lug 161 with a beveled face in its upper side. The distance between these two stop-lugs 160 and 161 is less than the diameter of the circular path through which the end 152 of the clutch bolt-arm 149 must swing to revolve, consequently no matter in which position the lever 154 is placed the yoke or frame will assume a position in which one or the other of the stop lugs 160 or 161 will project across the path of said arm-end 152.

It is therefore to be understood that the shifting of lever 154 and the rock-shaft 155 will move the yoke or frame 158 laterally to one side or the other so that, for example, lug 160 will be withdrawn from the path of the clutch bolt-arm 149 and by releasing the latter permit the spring 153 in the driver 141, to exert its force on the arm and tend to push the arm away from the shoulder 151. This movement cannot take place however until the notched portion 147 of the clutch-bolt 146 comes into register with one of the cross-grooves or ways 144 in the bushing, as the latter revolves about the clutch-bolt 146. When this registration of the bolt and groove takes place however, the spring-pressure on the bolt-arm 149, will immediately rock the bolt and cause it to enter the groove or way 144 and thus lock the bushing and the shaft 61, as shown in Fig. 10 of the drawing.

A cover-plate 162, as shown in Figs. 2ᵃ and 7 of the drawings, serves to cover the casing or base at the rear side so that by removing this cover access to the yoke or frame and the clutch bolt-driver and bolt may be gained.

In practice I have found it desirable and advantageous to provide some means for holding the lever 154 in either of its operating positions, and in this instance I do this by providing an arm 163 on the rock-shaft at the base of the lever.

This arm 163 has a concavity in its free end so that the convex head 164 of a bolt 165, may seat in said concavity and be continuously pressed forward therein by means of a spring 166, as shown in Fig. 1ᵃ of the drawings.

When the lever 154 is moved to the left the arm 163 will have a slight inclination downward from the shaft 155 and the bolt-head 164 will be pressed into the cavity in the end of the arm 163 and hold the latter in its downwardly-inclined position.

When the lever 154 is moved to the right the arm 163 will have an upwardly-inclined position and the bolt-head 164 will press against the end thereof and hold the same in this latter position. Thus the bolt 165 and its head 164 will yieldingly hold the arm 163 in either of its two operating positions.

A drain pipe 167 extends upwardly at the side of the machine and has a telescoping connection 168 with the casing of the water-supply valve 94,—for snifting or venting air from the bottle at intervals during the filling operation,—the telescoping of the connection 168 permitting the head and valve to move vertically to the filling and crowning positions while the pipe 167 remains stationary.

A bracket 169 carries a vertically-adjustable table 170 on which a motor (not shown) may be secured for driving the machine,—the table 170 being vertically adjustable through the operation of an adjusting hand wheel 171.

The syruper 173 as shown in Fig. 1 of the drawing comprises a cylindrical body 180 which is sustained in a bracket 181 that is attached to the side of the vertically movable head 78. This bracket 181 therefore, in this instance, moves vertically as the head is thus moved. The syruper 173 fits loosely in a cylindrical retainer 182 carried by the bracket so that the syruper may project down through said retainer and hang pendantly or be held in a floating condition with respect to the bracket.

The bottle-neck guide 183; tube 184 and valve-head 185 may all have a slight vertical movement independently of the cylindrical body 180, but this movement is slight because it is intended to be merely sufficient to close the supply-port 186 from the passage 187 and open communication between the said passage 187 and the outlet passage, down through the tube 184 in order that the measured liquid may be forced out of the cylinder by the weighted plunger 188 in the cylindrical body 180.

The suspension of the cylindrical body 180 in a floating condition at the side of the head 78 however serves a decidedly novel and useful purpose in that it permits the entire syruper body to accommodate itself to the variations in the heights of the bottles that are to be filled.

For example, when an empty bottle is in position on the table 39 to be supplied with a quantity of syrup or flavoring, another bottle, which has just previously been supplied with such syrup will also be seated on said table at the side of the empty bottle. The next operation of the machine is to cause a relative movement between the bottles on the one hand and the head 78 and syruper 173 on the other hand whereby the bottles and said head and syruper will be brought into such relation that the empty bottle may receive syrup while the other bottle may receive a charge of carbonated water.

While the bottles are presumed to be of substantially the same height there is, in practice, quite a variation in their heights so that provisions must be made to accommodate the structures to such variations.

In the case of the syruper, the latter is suspended in a floating condition so that when the bottle-mouth engages the guide 183, the first operation is to move the tube 184 and valve-head 185 up to close the supply-port 186 and open the outlet-ports 189 into the tube 184. It is desirable to effect this movement quickly in order that the supply-port 186 be promptly closed. This movement is therefore designed to be a slight one and therefore cannot be utilized to compensate for the variations in the heights of the bottles to be filled.

To therefore provide for the bottle variations but at the same time make use of a slight movement of the tube 184 and guide 183, the syruper 173 is suspended in a floating condition so that after the valve has been operated the syruper may yield in the bracket retainer 182 and allow the head 78 and bracket 181 to continue its movement while the syruper will simply be supported on top of the bottle mouth.

*Operation.*

Two bottles 172 are placed on the table 39,—one against stop 40 and the other against stop 41 so the former will register with the syruper 173, while the latter bottle will have position under the crowning and filling head.

The operating lever 154 will then be moved to the left, as shown in Fig. 1ª of the drawing which causes the cam 139 to depress yoke-bar 52 and lower the head 78 over the neck of the bottle 172 directly beneath it. At the time of this preliminary downward movement of the head the gasket 82 is compressed as shown in Figs. 25 and 34 of the drawing so that the bottle neck must be forced into the center opening of the compressed gasket which makes a fluid and gas-tight joint about the bottle-neck.

During this preliminary downward movement of the head 78, the roller 124 at the upper end of the rod 102 and which has been held up by the lever 107—110 engaging the stop 112, will be lowered owing to the fulcrum 108 of lever 107 being lowered with bracket 100 which is attached to the head 78. The lowering of the rod 102 also forces the slide valve 98 downwardly until the slide 114 seats against and covers the crown-feed port 95, also as shown in Fig. 25. The slide valve 98 is pressed down by the spring 104.

The operator next opens the valve 94 and allows carbonated water or other liquid to flow into the bottle 172 through the vortex nozzle 81.

Venting of the air from the bottle is accomplished by shifting the lever of the valve periodically to allow such air to escape.

The vortex nozzle, as its name implies permits the liquid entering through the passages 174 to meet on the inside of the nozzle in the form of a vortex and through the opening formed in the middle of the vortex, the air is able to pass and vent from the bottle.

During this filling operation, the head has simply made a partial downward movement and has stopped in the position shown in Fig. 25, and also illustrated in the diagrammatic view of Fig. 34,—the normal elevated position of the head being shown in the diagrammatic view of Fig. 33, wherein the gasket 82 is shown in a contracted condition.

When the filling of the bottle has been completed, the operator will move the liquid supply valve 94 to the cut-off position. At the same time the lever 154 will be moved to the right which will again bring the mechanism into operation and cause the head 78 to make a further downward stroke, during which movement, the throat 80 will be forced down onto the head of the bottle-neck which seats the crown and crimps the flange thereof under the locking shoulder on the bottle neck as shown in Figs. 26 and 35 of the drawings, during which time it will be noted that the throat gasket 82 has expanded so as to allow the crowned bottle to pass through the same during the upward movement of the head, as more clearly shown in Fig. 36 of the drawing.

This further downward movement of the head is effected by the crowning-cam 139 and as the latter completes its work the return-cam 63 begins to operate on the yoke-frame 52 and immediately returns the head to the normal elevated position. It is therefore to be understood that there is practically no time interval or delay in the return of the head after it has made its further downward travel to crimp the crown on the bottle.

It is therefore to be understood that two movements of the operating lever 154 are necessary to cause one complete revolution of the shaft 61, and that one part of the revolution causes the head 78 to be lowered to the filling position as in Fig. 34, and the other part of the revolution causes the head to be lowered to crown the bottle as in Fig. 35 and then raise the head to its normal elevated position as in Fig. 34.

Motion to the head is effected through the vertical movement of the yoke-frame 52 whose upper end is securely connected to the rod 50.

The cylinder 70 houses the compensator spring 69 which is assembled in a compressed condition.

When the cam 139 draws the rod 50 downwardly it transmits its motion to the compensating spring 69 and in the event that the resistance to the motion does not exceed the pressure exercised by the said spring 69, the latter will transmit the motion to the cylinder 70 and the head ram 73.

In case the resistance to the downward motion of the rod 50 is greater than the pressure exercised by the spring 69, such for example as when the throat 80 has completed the crimping of the crown on the bottle neck before the head has completed its downward stroke, then the compensator spring 69 will compress and no further downward movement of the cylinder 70 and head ram 73 will take place, thus avoiding the crushing of the bottle.

By reference to Fig. 2 of the drawing it will be seen that the upper end of rod 50 carries an arm 175 which reciprocates vertically therewith and that this arm is connected to a rod 176, which, through a suitable driving clutch 177, intermittently rotates a crown-feed shaft 178 to revolve an agitator device 179 which latter effects the feeding of crowns to the chute 122.

Having described my invention, I claim,—

1. A machine of the character described having a crowning-head with a crown passage therein, means for moving the head, means supported independently of the head but movable to and from the crown-passage to feed crowns one at a time thereto, said means being moved by the head, means movable lengthwise of the head for closing said passage when the crown feed moves away therefrom, said latter means also being moved by the head and means for filling the container while the passage is closed.

2. A machine of the character described having a crowning-head with a crown passage therein, a crown-chute movable to and from the crown-passage to feed crowns one at a time thereto, means for closing said passage while the crown chute is away therefrom, means for filling the container while the passage is closed, means for actuating and moving the head to apply the crown and means operating between the movable head and the passage-closing means and crown-chute to move said closing means and chute.

3. A machine of the character described having a crowning-head with a crown-passage opening at one side thereof, a filling nozzle carried by said head beneath the said passage, a wedge-block at the side of the head for closing said crown-passage during the filling operation, and means for seating the wedge-block against the side of the head and over said crown-passage.

4. A machine of the character described having a head with a crown-passage at one side thereof, crowning elements carried by the head, a nozzle carried by the head, container-sealing means also carried by the head, a slide valve movable longitudinally of the head and covering the crown-passage, said slide-valve having wedge means to seat it against the head during the filling operation.

5. A machine of the character described having a head with a crown-passage at one side thereof, crowning elements carried by the head, a nozzle carried by the head, container-sealing means also carried by the head, a slide valve having two wedge parts one of which seats against the head over the crown-passage and means for moving the wedge-parts of the slide valve to cause one of them to have a vertical and a lateral movement in seating over the crown-passage.

6. A machine of the character described having a head with a crown-passage at one side thereof, crowning elements carried by the head, a nozzle carried by the head, container sealing-means also carried by the head, a slide valve device movable longitudinally at the side of the head, said slide device comprising two plates having wedge-shape coacting surfaces and having vertical movement at the side of the head and one of said plates being provided with sealing means to seat about the entrance to said crown-passage and means for moving said plates.

7. A machine of the character described having a head with a crown-passage at one side thereof, crowning elements carried by the head, a nozzle carried by the head, container sealing-means also carried by the head, said head being provided with an enlargement having a guide-recess therein, a slide-valve block in said recess, a wedge-plate movable with respect to the enlargement and in a direction at right-angles to the crown-passage to cut-off the latter, and means for operating said valve-block and wedge-plate.

8. A machine of the character described having a head with a crown-passage at one side thereof, crowning elements carried by the head, a nozzle carried by the head, container sealing-means also carried by the head, a bracket-plate at one side of the head, a slide-block held by said bracket-plate, a wedge plate coacting with the slide-block and carrying a gasket to seat over the crown-passage and means for operating said slide-block and wedge-plate.

9. A machine of the character described having a head with a crown-passage opening at one side thereof, crowning elements carried by the head, a nozzle carried by the head, container sealing-means also carried by the head, a slide valve at one side of the head, said valve having a wedge-face at one side, a wedge-plate seated against said wedge-face of the valve and movable with respect thereto, an actuating rod connected with the slide valve, a stationary stop device and a lever having one end attached to said rod and its other end in position to engage said stationary stop as the head and the slide-valve and wedge-plate are moved.

10. A machine of the character described having a reciprocating crowning-head, a filling-nozzle carried by the head, a sealing-gasket, a cup beneath the filling-nozzle and said cup supporting the sealing-gasket, links depending at opposite sides of the head and engaging the cup, means pivotally carried by the crowning head and also pivotally connected to the said links on the opposite sides of the head for moving said links and the cup to compress the sealing gasket and adjustable trip devices for actuating the latter pivoted means as the head is reciprocated.

11. A machine of the character described having a reciprocating crowning head, a filling nozzle carried by the head, a sealing gasket having an opening therethrough for the entrance of a bottle-neck, a cup for sustaining the gasket, a plurality of links carried by and moving with the head said levers engaging the said cup to move the latter for contracting the gasket to enable it to effect a sealing joint about the bottle neck, a stationary device for actuating said links to contract the gasket when the head moves in one direction and another stationary device to operate said links when the head moves in a reverse direction for effecting an expansion of the gasket to permit the crowned bottle-neck to be withdrawn therefrom.

12. A machine of the character described having a movable head with a crown-feed port and a liquid feed port, a hopper for crowns, crown-delivery means movable with respect to the hopper and also movable to and from the crown-feed port of the head to supply crowns thereto slide-valve means for closing the port and reciprocating means actuated by the movement of the head for operating the slide valve to close the port and to positively move the crown delivery means from said port.

13. A machine of the character described having a crowning-head with a crown-passage opening at one side thereof, a filling nozzle carried by said head beneath said passage, a movable crown-chute to register with said passage, a slidable device on the head and carrying a wedge-plate to seat against and close the crown-passage, lever-means carried by the head for moving the slidable device and the wedge-plate, a stationary stop for actuating said lever means, means operating with the head for moving the crown-chute and means for actuating the head to move it to a filling position and by such movement actuate the said lever-means.

14. A machine of the character described having a reciprocating head with a crown port opening laterally therethrough, a slide valve device having a wedge member for seating over and closing the entrance to the crown port, said slide valve and wedge member being actuated through the movement of the head.

15. A machine of the character described having a reciprocating head with a crown port opening laterally therethrough, a slide valve device having a wedge member to seat over the entrance to the crown port, a crown-feed chute movable to and from said crown port entrance, means for actuating the slide valve and its wedge member through the movement of the head, means for actuating the chute by the movement of the head and means for holding the crowns in the chute while the latter is moved away from the entrance to the crown port.

In testimony whereof I affix my signature.

GEORGE JOHN HUNTLEY.